(12) United States Patent
Puttamraju et al.

(10) Patent No.: US 11,840,471 B1
(45) Date of Patent: Dec. 12, 2023

(54) METHOD FOR REMOVING PER- AND POLYFLUOROALKYL SUBSTANCES (PFAS) FROM WASTE WATER

(71) Applicant: Republic Services, Inc., Phoenix, AZ (US)

(72) Inventors: Pavan Puttamraju, Phoenix, AZ (US); Kevin D. Torrens, Lagrangeville, NY (US); Yun Yu, Broomfield, CO (US)

(73) Assignee: REPUBLIC SERVICES, INC., Phoenix, AZ (US)

( * ) Notice: Subject to any disclaimer, the term of this patent is extended or adjusted under 35 U.S.C. 154(b) by 107 days.

(21) Appl. No.: 17/555,794

(22) Filed: Dec. 20, 2021

(51) Int. Cl.
| | |
|---|---|
| *C02F 9/00* | (2023.01) |
| *C02F 1/24* | (2023.01) |
| *C02F 1/56* | (2023.01) |
| *C02F 1/66* | (2023.01) |
| *C02F 1/74* | (2023.01) |
| *B03D 1/016* | (2006.01) |
| *E21B 21/06* | (2006.01) |
| *C02F 1/78* | (2023.01) |
| *C02F 101/36* | (2006.01) |
| *C02F 103/06* | (2006.01) |
| *C02F 103/10* | (2006.01) |
| *E21B 43/40* | (2006.01) |

(52) U.S. Cl.
CPC ............. *C02F 9/00* (2013.01); *B03D 1/016* (2013.01); *C02F 1/24* (2013.01); *C02F 1/56* (2013.01); *C02F 1/66* (2013.01); *C02F 1/74* (2013.01); *E21B 21/063* (2013.01); *C02F 1/78* (2013.01); *C02F 2101/36* (2013.01); *C02F 2103/06* (2013.01); *C02F 2103/10* (2013.01); *E21B 43/40* (2013.01)

(58) Field of Classification Search
None
See application file for complete search history.

(56) References Cited

U.S. PATENT DOCUMENTS

| | | |
|---|---|---|
| 5,053,140 A | 10/1991 | Hurst |
| 5,352,436 A | 10/1994 | Wheatley et al. |
| 6,297,308 B1 | 10/2001 | Jariwala et al. |
| 6,518,442 B1 | 2/2003 | Felix et al. |
| 6,613,941 B1 | 9/2003 | Felix et al. |
| 7,018,541 B2 | 3/2006 | Hintzer et al. |
| 8,669,212 B2 | 3/2014 | Norman et al. |
| 8,772,204 B2 | 7/2014 | Norman et al. |

(Continued)

FOREIGN PATENT DOCUMENTS

| | | |
|---|---|---|
| CN | 110127892 A | 8/2019 |
| CN | 110342728 A | 10/2019 |

(Continued)

OTHER PUBLICATIONS

Kulikowska et al. (Brazilian Journal of Chemical Engineering, 2012, 29, 211-219). (Year: 2012).*

(Continued)

*Primary Examiner* — Clare M Perrin
(74) *Attorney, Agent, or Firm* — Ballard Spahr LLP

(57) ABSTRACT

Disclosed is a method for enhancing the removal of a per- and polyfluoroalkyl substances (PFAS) component from waste water using a cationic polymer (e.g., a cationic polymer flocculant or coagulant). The cationic polymer enables gas that is diffused through the waste water to carry at least a portion of the PFAS component to the surface of water, creating a foam that can then be removed.

34 Claims, 21 Drawing Sheets

(56) References Cited

U.S. PATENT DOCUMENTS

| | | | |
|---|---|---|---|
| 9,957,172 B2 | 5/2018 | Niu et al. | |
| 10,259,730 B2 | 4/2019 | Ball et al. | |
| 10,519,052 B2 | 12/2019 | Ball et al. | |
| 10,752,521 B2 | 8/2020 | Nelson | |
| 10,865,128 B2 | 12/2020 | Ball | |
| 10,954,144 B2 | 3/2021 | Ball et al. | |
| 2005/0150833 A1 | 7/2005 | Funaki et al. | |
| 2005/0173347 A1 | 8/2005 | Hintzer et al. | |
| 2007/0138110 A1 | 6/2007 | Welcker | |
| 2011/0017677 A1 | 1/2011 | Evans | |
| 2014/0246366 A1* | 9/2014 | Kerfoot | C02F 1/722 210/170.07 |
| 2015/0360975 A1 | 12/2015 | Niu et al. | |
| 2019/0176101 A1 | 6/2019 | Phillips et al. | |
| 2019/0241452 A1* | 8/2019 | Ball | C02F 1/727 |
| 2019/0263679 A1 | 8/2019 | Phillips et al. | |
| 2020/0155885 A1* | 5/2020 | Strathmann | A62D 3/37 |
| 2020/0206793 A1 | 7/2020 | Brady | |
| 2020/0222953 A1* | 7/2020 | Morrell | B09C 1/025 |
| 2020/0262719 A1 | 8/2020 | Pennell et al. | |
| 2020/0292516 A1 | 9/2020 | Kaltenberg et al. | |
| 2020/0376406 A1* | 12/2020 | Clerkin | B01D 1/16 |
| 2020/0407241 A1 | 12/2020 | Dejarme et al. | |
| 2021/0008522 A1 | 1/2021 | Reeve et al. | |
| 2021/0107816 A1 | 4/2021 | Ball | |
| 2021/0130201 A1 | 5/2021 | Kerfoot | |
| 2021/0171365 A1 | 6/2021 | Nelson | |
| 2021/0206673 A1 | 7/2021 | Ball et al. | |

FOREIGN PATENT DOCUMENTS

| | | | |
|---|---|---|---|
| EP | 2763790 B1 | 9/2017 | |
| EP | 3738674 A1 * | 11/2020 | B03D 1/00 |
| JP | 2010/022961 A | 2/2010 | |
| JP | 2010075834 A2 | 4/2010 | |
| JP | 5112231 B2 | 1/2013 | |
| WO | WO 2011/018514 | 7/2011 | |
| WO | WO 2015/027107 | 2/2015 | |
| WO | WO 2016/096885 | 6/2016 | |
| WO | WO 2017/210752 | 12/2017 | |
| WO | WO 2017/218335 | 12/2017 | |
| WO | WO-2019051208 A1 * | 3/2019 | B09C 1/002 |
| WO | WO 2019/111238 | 6/2019 | |
| WO | WO 2019/113268 | 6/2019 | |
| WO | WO 2020/097694 | 5/2020 | |
| WO | WO-2020097694 A1 * | 5/2020 | C02F 1/465 |
| WO | WO 2020/191446 | 10/2020 | |
| WO | WO 2020/260487 | 12/2020 | |

OTHER PUBLICATIONS

Bolea, "PFAS Treatment Technology Overview for Leachate," copyright 2020, presented at MWRA/MPART/MWEA meeting on Nov. 3, 2021.

Burns et al., "PFAS Removal from Groundwaters Using Surface-Active Foam Fractionation," Remediation, pp. 1-15, Aug. 24, 2021.

OPEC Systems, SAFF40® Open-Day 2 Presentation, ITRC Remediation Theme: Separation + Concentration + Destruction, obtained Jul. 7, 2021.

OPEC Systems, PFAS Remediation, Case Study No. 1: AACO (GW 2020), Surface Active Foam Fractionation (SAFF®) Presentation, obtained Jul. 7, 2021.

OPEC Systems, PFAS Remediation, Case Study No. 2: Swedish Leachate (Jan. 2021), Surface Active Foam Fractionation (SAFF®) Presentation, obtained Jul. 7, 2021.

Ebersbach, I., Ludwig, S.M., Constapel, M., Kling, H.W., An alternative treatment method for fluorosurfactant-containing wastewater by aerosol-mediated separation, Water Res., 2016, 101, 333-340.

Lee, Y., Wang, P., Lo, S., Huang, C. P., Recovery of perfluorooctane sulfonate (PFOS) and perfluorooctanoate (PFOA) from dilute water solution by foam flotation, Separation and Purification Technology, 2017, 280-285.

Li, Y., Chien, W., Liu, Y., Lee, Y., Lo, S. Hu, C., Perfluorooctanoic acid (PFOA) removal by flotation with cationic surfactants, Chemosphere, 2021, 128949.

Lin, J., Hu, C., Lo, S., Effect of surfactants on the degradation of perfluorooctanoic acid (PFOA) by ultrasonic (US) treatment, Ultrasonics Sonochemistry, 2016, 130-135.

Lyu, X., Liu, Y., Chen, C., Sima, M., Lyu, J., Ma, Z., Huang, S. Enhanced use of foam fractionation in the photodegradation of perfluorooctane sulfonate (PFOS), Separation and Purification Technology, vol. 253, 2020, 117488.

Meng, P., Deng, S., Maimaiti, A., Wang, B., Huang, J., Wang, Y., Cousins, I.T., Yu, G., Efficient removal of perfluorooctane sulfonate from aqueous film-forming foam solution by aeration-foam collection. Chemosphere. 2018, 203, 263-270, Abstract only.

Nan, S.,Wang, F.,Wang Q.,Dou M., Process Integration of Nanofiltration and Foam Separation for Disposal of Waste Water with Low Concentration Ammonium Perfluorooctanoate, J Chem Eng Chin Univ Nan, 2009.

Robey, N.M., da Silva, B.F., Annable, M.D, Townsend, T.G., Bowden, J.A., Environmental Science & Technology 2020 54 (19), 12550-12559.

Wang, W., Du, Z., Deng, S., Vakili, M., Ren, L., Meng, P., Maimaiti, A., Wang, B., Huang, J., Wang, Y., Yu, G, Regeneration of PFOS loaded activated carbon by hot water and subsequent aeration enrichment of PFOS from eluent, Carbon, 134, 2018, 199-206.

Zhang, W., Liang, Y., Removal of eight perfluoroalkyl acids from aqueous solutions by aeration and duckweed, Science of the Total Environment, vol. 724, 2020, 138357.

CDM Smith, "New PFAS Treatment Fights PFAS with Natural Foam Fractionation", https://www.cdmsmith.com/en/Client-Solutions/Insights/SAFF-Deployment, Accessed Jan. 25, 2022.

* cited by examiner

METHOD FOR REMOVING PER- AND POLYFLUOROALKYL SUBSTANCES (PFAS) FROM WASTE WATER

BACKGROUND

Per- and polyfluoroalkyl substances (PFAS) are a group of synthetic chemicals that includes perfluorooctanoic acid (PFOA), perfluorooctanesulfonic acid (PFOS), and others. PFAS have been manufactured and used in various industries in the United States since the 1940s. PFAS are known as "forever chemicals" due to their persistence in the environment and in animals and humans. In general, these chemicals do not degrade and continue to accumulate. While certain PFAS are phased-out and are no longer manufactured in the United States, PFAS continue to occur and persist in the water cycle from groundwater, surface water, wastewater effluents and landfill leachate. A number of studies have examined the toxicity and the environmental and public health impacts of PFAS. Research suggests that PFAS could potentially increase cholesterol levels, decrease infant birth weight, increase the risk of high blood pressure, and increase the risk of kidney and other types of cancers.

There continues to be a need for PFAS removal treatment technologies. With respect to waste water such as landfill leachate, PFAS removal is complicated in part due to the highly complex matrix of the effluent. Existing treatment methods for PFAS include granular and powdered activated carbon, ion exchange resins, nanofiltration, and reverse osmosis. For landfill leachate treatment in particular, these technologies can be impractical or too costly to implement on a large scale.

SUMMARY

This disclosure relates to a method for enhancing the removal of a PFAS component from waste water using a cationic polymer. The cationic polymer enhances PFAS partitioning at the air-water interface when a gas is bubbled through the waste water to create a foam layer that can then be separated to remove PFAS from the aqueous phase. PFAS removal is highly effective using this approach.

In one embodiment, the method comprises contacting the waste water comprising water and the PFAS component with the cationic polymer. In another embodiment, the method consists essentially of contacting the waste water comprising water and the PFAS component with the cationic polymer. Suitable cationic polymers include those that comprise at least one of a polyacrylamide, a polyacrylic acid, a polydiallyldimethyl ammonium, or a polyamine. After contacting the waste water with the cationic polymer (or simultaneously with this step in a continuous process), gas can be bubbled through the waste water to form a foam on the surface of the waste water comprising the gas and at least some of the PFAS component. At least some of the foam can then be removed off the surface of the waste water, effectively removing at least some of the PFAS component from the waste water to form a lower PFAS component content waste water. In one embodiment, these method steps all take place in the same vessel (such as a tank, chamber, or container), thus allowing the above steps of contacting with the cationic polymer, bubbling a gas, and removing the foam to all be performed efficiently in one vessel without having to transfer any intermediate product to another vessel to complete the process.

In a further embodiment, the method involves the use of a cationic polymer comprising a polydiallyldimethyl ammonium having the following repeating unit:

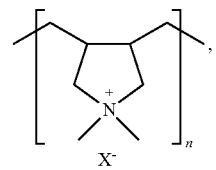

where X is halide, $BF_4$, or $PF_6$; or a polyamine having the following repeating unit:

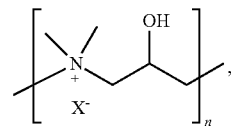

where X is halide, $BF_4$, or $PF_6$.

BRIEF DESCRIPTION OF THE DRAWINGS

The foregoing summary, as well as the following description of the disclosure, is better understood when read in conjunction with the appended drawings. For the purpose of illustrating the disclosure, the drawings illustrate some, but not all, alternative embodiments. This disclosure is not limited to the precise arrangements and instrumentalities shown. The following figures, which are incorporated into and constitute part of the specification, assist in explaining the principles of the disclosure.

FIG. 7A, FIG. 7A-1, and FIG. 7A-2, collectively, are bar graphs showing change in PFAS concentration in leachate after treating with PolyDADMAC, compared to polyamine.

FIG. 7B, FIG. 7B-1, and FIG. 7B-2, collectively, are the same bar graphs shown in FIGS. 7A, 7A-1, and 7A-2, except with a modified y axis to better depict the magnitude of PFAS reduction.

DETAILED DESCRIPTION

A. Definitions

Figure 1:
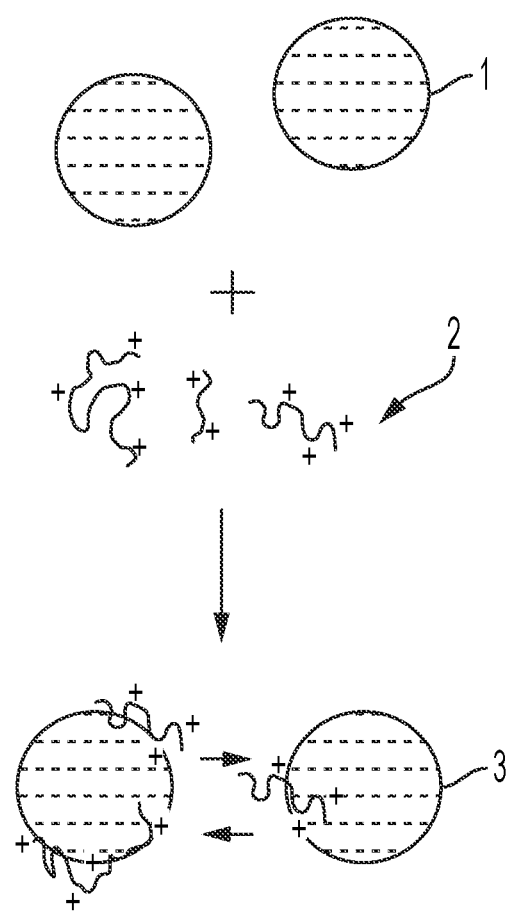
FIG. 1 is an exemplary schematic illustrating the charge-neutralization effect on air bubbles when combined with a suitable polymer such as a cationic polymer.

"Waste water" means water containing organic material, particularly aqueous waste disposed or emitted in run off or otherwise from domestic, municipal, commercial, industrial, or agricultural uses. Waste water can include, for example, leachate, landfill leachate, landfill liquid, condensate, or gas well liquid. "Landfill leachate" means any liquid that enters landfill from external sources such as rainfall, surface drainage, underground springs and groundwater, and from the liquid produced from the putrefaction of waste. Waste water described as having an amount of a substance in terms of mass per liter (e.g., mg/L of total dissolved solids) refers to the mass of the substance per liter of waste water.

"Per- and polyfluoroalkyl substances (PFAS)" refers to organic compounds having one or more fluorine atoms. PFAS typically include fluorinated $C_2$-$C_{18}$ alkyl chains. The term includes perfluorinated carboxylic acids (PFCA) and perfluorinated sulfonic acids (PFCS). PFAS encompasses perfluorooactane sulfonic acids (PFOS), perfluorooctanoic acids (PFOA), perfluoroalkyl acids (PFAA), as well as other short- and long-chain PFAS. PFOA and PFOS are commonly known as examples of PFCA and PFCS. Because PFAS that include an acidic proton generally have a pKa below 7 (such as the case with sulfonic and carboxylic acids), PFAS often exist in an anionic or deprotonated state in waste water (e.g., landfill leachate). Any reference to PFAS in acidic or protonated form includes the anionic counterpart (e.g., reference to sulfonic and carboxylic acids contemplates counterpart sulfonates and carboxylates). Common PFAS that are present in waste water include those listed by category (PFSA, PFCA, FTSA) in Table 1, which again are often present in anionic or deprotonated form.

TABLE 1

Common PFAS

| Abbreviation | Name | Carbon Chain Length |
|---|---|---|
| PFSA | Perfluorosulfonic acid | — |
| PFBS | Perfluorobutane sulfonic acid | 4 |
| PFPeS | Perfluoropentane sulfonic acid | 5 |
| PFHxS | Perflurohexane sulfonic acid | 6 |
| PFHpS | Perfluoroheptane sulfonic acid | 7 |
| PFOS | Perfluorooctane sulfonic acid | 8 |
| PFNS | Perfluorononane sulfonic acid | 9 |
| PFDS | Perfluorodecane sulfonic acid | 10 |
| PFDoS | Perfluorododecane sulfonic acid | 12 |
| PFCA | Perfluorocarboxylic acid | — |
| PFBA | Perfluorobutanoic acid | 4 |
| PFPeA | Perfluoropentanoic acid | 5 |
| PFHxA | Perfluorohexanoic acid | 6 |
| PFHpA | Perfluoroheptanoic acid | 7 |
| PFOA | Perfluorooctanoic acid | 8 |
| PFNA | Perfluorononanoic acid | 9 |
| PFDA | Perfluorodecanoic acid | 10 |
| PFUnDA | Perfluoroundecanoic acid | 11 |
| PFDoDA | Perfluorododecanoic acid | 12 |
| PFTrDA | Perfluorotridecanoic acid | 13 |
| PFTDA | Perfluorotetradecanoic acid | 14 |
| FTSA | Fluorotelomer sulfonic acid | — |
| 4:2 FTSA | 4:2 Fluorotelomer sulfonic acid | 4 |
| 6:2 FTSA | 6:2 Fluorotelomer sulfonic acid | 6 |
| 8:2 FTSA | 8:2 Fluorotelomer sulfonic acid | 8 |

"Cationic polymer" includes polymers having at least one cationic component. Without being bound by any theory, the cationic polymer can function as a flocculant or coagulant and can form flocs from individual small particles by adsorbing onto particles through bridging or charge neutralization. The cationic polymer can also be referred to as a "cationic polymer flocculant" or "cationic polymer coagulant." Generally, the cationic polymers are water soluble. Ammonium, sulfonium, and phosphonium quaternaries, among others, can be used as a cationic monomer component to make cationic polymers. Alternatively, neutral variations can be protonated after polymerization. The term includes amphoteric polymers that have both a cationic and anionic component, provided that the balance of collective charge is cationic.

Molecular weights of the cationic polymers can vary. Some cationic polymers can be effective at lower molecular weight, for example as low as 1,000 g/mol in weight-average molecular weight. But in general, the cationic polymers will have higher molecular weights, e.g., up to 50,000,000 g/mol in weight-average molecular weight. The polymers described below, including the polyacrylamides, polyacrylic acids, polydiallyldimethyl ammoniums, and polyamines, can have any suitable molecular weight, e.g., ranging from 1,000-50,000,000 g/mol on a weight-average molecular weight basis.

"A polyacrylamide" refers to a polymer having the following repeating unit.

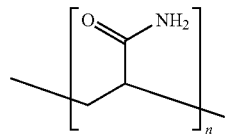

A "cationic polymer" that comprises "a polyacrylamide" refers to a polymer having the acrylamide repeating unit shown above in combination with another cationic repeating unit, such as the ammonium salt in the copolymer shown below.

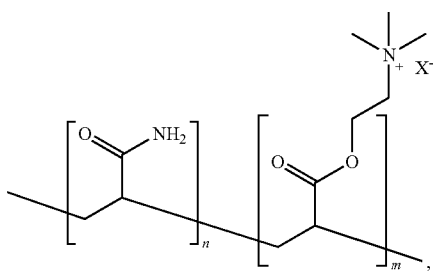

where X denotes a suitable anion, such as halide (e.g., F, Cl, Br, I), $BF_4$, $PF_6$, among others. Any suitable cationic monomer (e.g., those with ammonium, sulfonium, and phosphonium quaternaries) can be copolymerized with acrylamide to form suitable polyacrylamide-based polymers for use as cationic polymers. The cationic polyacrylamide copolymers can be block or random copolymers, whether linear or branched.

"A polyacrylic acid" refers to a polymer having the following repeating unit.

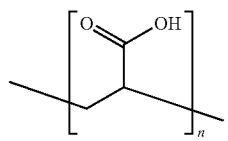

A "cationic polymer" that comprises "a polyacrylic acid" refers to a polymer having the acrylic acid repeating unit shown above in combination with another cationic repeating unit, such as an allylamine-based salt in the copolymer shown below.

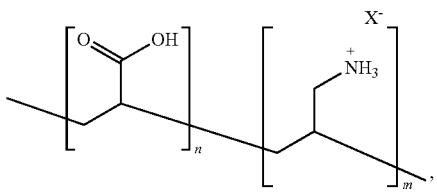

where X denotes a suitable anion, such as halide (e.g., F, Cl, Br, I), $BF_4$, $PF_6$, among others. Any suitable cationic monomer (e.g., those with ammonium, sulfonium, and phosphonium quaternaries) can be copolymerized with acrylic acid to form suitable polyacrylic acid-based polymers for use as cationic polymers. The cationic polyacrylic acid copolymers can be block or random copolymers, whether linear or branched.

"A polydiallyldimethyl ammonium" refers to a polymer having the following repeating unit.

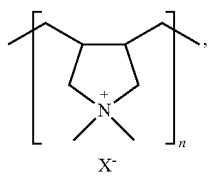

where X denotes a suitable anion, such as halide (e.g., F, Cl, Br, I), $BF_4$, $PF_6$, among others. The polydiallyldimethyl ammonium polymer can be a homopolymer or can be a copolymer having another repeating unit and can be block or random, and linear or branched. A "cationic polymer" that comprises "a polydiallyldimethyl ammonium" refers to a polymer having the diallyldimethyl ammonium repeating unit shown above either alone as a homopolymer or in combination with repeating units from other suitable comonomers. One specific example of a suitable polydiallyldimethyl ammonium is polydiallyldimethyl ammonium chloride (also called polyDADMAC), though the chloride counterion is not particularly important and any suitable substitute can be used.

"A polyamine" refers to a polymer having at least one repeating unit that comprises a nitrogen-based quaternary salt. A non-limiting example of such a polyamine includes the polydimethylamine shown below.

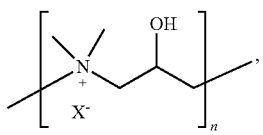

where X denotes a suitable anion, such as halide (e.g., F, Cl, Br, I), $BF_4$, $PF_6$, among others. A "cationic polymer" that comprises "a polyamine" refers to a polymer having a polyamine such as the one shown above either alone as a homopolymer or in combination with repeating units from suitable co-monomers.

"Foam" means a substance that is formed by trapping gaseous bubbles in a liquid, gel, or semisolid form. The foam produced by the disclosed method generally comprises gas bubbles, PFAS removed from waste water (e.g., landfill leachate), and at least some of the residual cationic polymer.

A "diffused gasification process," e.g., a "diffused aeration process," refers to a subsurface form of gasification, e.g., aeration, that operates vertically, in which gas bubbles are introduced near the bottom of a vessel and diffused toward the surface.

"Removal efficiency" refers to the amount of PFAS removed from the waste water (e.g., landfill leachate) after treating the waste water using the treatment method. Removal efficiency in terms of percentage can be calculated by the following equation: 1−([PFAS concentrations in the treated waste water]/[starting PFAS concentration in the raw waste water])×100=percent removal. In the first row of Table 4 below (referring to "Site A"), for example, the starting PFOS in the raw landfill leachate was 750,000 nanograms per liter (ng/L), and the final PFOS after treatment was 2,000 ng/L, resulting in a percent removal of 99.7%.

When the term "about" precedes a numerical value, the numerical value can vary within ±10% unless specified otherwise.

B. PFAS Removal Method

A variety of short- and long-chain PFAS can be removed from waste water using the disclosed method. The method uses certain cationic polymers (e.g., cationic polymer flocculants or coagulants) that enhance PFAS partitioning to the gas bubble-waste water interface to create a PFAS-concentrated foam that can be separated from the waste water. Without being bound by any theory, pKa values of PFAS are generally less than 3.5. As a result, PFAS in wastewater, including landfill leachate, are generally in an anionic state, i.e., negatively charged. Certain PFAS present in anionic forms are carboxylates or sulfonates. An example is perfluorooctane sulfonic acid (PFOS) and its corresponding anionic sulfonate form shown below.

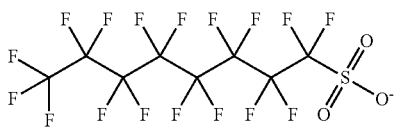

Referring to FIG. 1, gas bubbles 1, e.g., air bubbles, are also generally negatively charged in solution. As a result, repulsive electrostatic forces can prevent negatively charged PFAS from coalescing with air bubbles, preventing PFAS from partitioning at the air-water interface. To overcome electrostatic repulsion, cationic polymers 2 can be used as charge neutralizers to effectively neutralize the negative charges of air bubbles 3 and PFAS.

Figure 2:
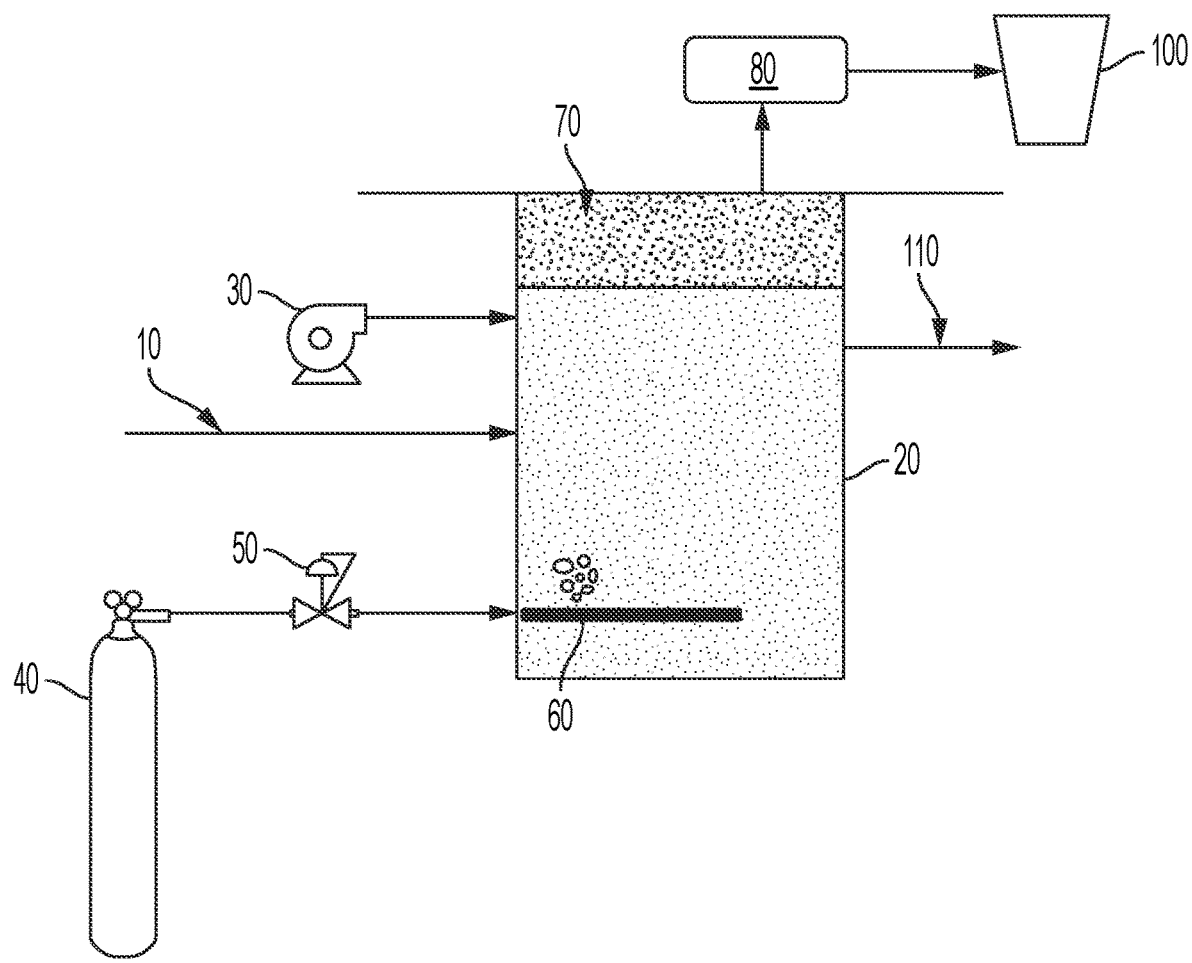
FIG. 2 is a process schematic showing an example of treating landfill leachate to remove PFAS.

An exemplary process flow diagram illustrating one embodiment of the method is shown in FIG. 2. Waste water 10 (e.g., landfill leachate) comprising PFAS can be fed into open-top tank 20. An aqueous solution or mixture of cationic polymer can be fed into open-top tank 20, for example using feed pump 30. The gas can be supplied to open-top tank 20 from a suitable gas source 40, and the flow rate of the gas can be controlled through pressure regulator 50. The gas supply can enter open-top tank 20 through any suitable component such as exemplary diffuser manifold 60.

As the cationic polymer contacts the waste water, it facilitates chemical or physical aggregation of small particles as well as PFAS. When this process occurs as gas bubbles diffuse through open-top tank 20, PFAS-laden bubbles rise to the surface of the waste water, creating foam 70. Resulting foam 70 can be removed from open-top tank 20 through any suitable separation method, such as by using foam recovery system 80. Foam recovery system 80 can include any mechanism, either automated, manual, or otherwise, for skimming the foam off the surface of the waste water, vacuuming foam into a collection system, or overflowing the foam into a collection tank.

Foam recovery system 80 can transmit the removed PFAS to a suitable collection system 100. The treated waste water can in turn be fed to a output line 110 and further processed as desired. In general, the treated waste water will comprise an output that has a lower PFAS content. Collection system 100 can include any known method for solidifying or storing the removed foam containing the PFAS. Output from the system as the removed foam containing the PFAS can in general be transported and stored in a landfill, transported to a deep well site for injection, or destroyed using suitable destruction technologies. In one embodiment, the lower PFAS component waste water can be discharged to a publicly owned treatment works.

The process illustrated in FIG. 2 can in some embodiments be continuous, i.e., waste water, cationic polymer, and gas can be fed into open-top tank 20 simultaneously, while foam 70 can be removed at the same time as bubbles form and rise to the top and accumulate at the surface of the waste water. Simultaneously, treated waste water can be sent to output line 110. In one embodiment, for example, the step of contacting the waste water with the cationic polymer and the separating the treated waste water are performed simultaneously in a continuous process. In other embodiments, any step of the treatment process can be performed in a separate order as part of a batch or semi-batch process.

The method is compatible with any waste water including landfill leachate as broadly defined above. In one embodiment, the waste water comprises a leachate, landfill liquid, condensate, or gas well liquid, or concentrate. In a further embodiment, the waste water (e.g., landfill leachate) comprises organic matter that has a chemical oxygen demand (COD) of 500 to 80,000 mg/L. In another embodiment, the waste water (e.g., landfill leachate) comprises total dissolved solids (TDS) concentrations of 1,000 to 15,000 mg/L. In a further embodiment, the waste water (e.g., landfill leachate) comprises ammonia nitrogen from 50 to 3,000 mg/L as nitrogen. The waste water (e.g., landfill leachate) can also contain any quantity of organic substances such as humic acids. In a further embodiment, the waste water (e.g., landfill leachate) can also contain humic acid and at least one metal. Leachate comprising at least one metal can also be effectively processed using the disclosed method. In one embodiment, either prior to or during the step in which the cationic polymer is introduced into the waste water, or prior to or during the step in which gas is bubbled into the waste water, the pH of the waste water (e.g., landfill leachate) can be adjusted to neutral, i.e., a pH of about 7, or alternatively to the pH above the pKa of PFAS.

The PFAS in the waste water can include any PFAS as broadly defined above. Concentrations of the PFAS can vary, for example from 10 ng/L to 25 mg/L of each individual PFAS component depending on the species. In one embodiment, the PFAS component comprises a perfluorosulfonic acid, a perfluorosulfonate, a perfluorocarboxylic acid, or a perfluorocarboxylate. In a further embodiment, the PFAS component comprises a perfluorosulfonic acid, a perfluorosulfonate, a perfluorocarboxylic acid, or a perfluorocarboxylate having from two to eighteen carbons, e.g., a $C_4$-$C_{14}$ perfluorosulfonic acid, perfluorosulfonate, perfluorocarboxylic acid, or perfluorocarboxylate. In a specific embodiment, the PFAS component comprises at least one of perfluorooctanoic acid (PFOA) or perfluorooctanesulfonic acid (PFOS), or as discussed above any anion thereof. In a further embodiment, the PFAS component comprises both PFOA and PFOS, either of which can be present as an anion or anionic salt.

Various types and doses of cationic polymers can be used as broadly defined above. In one embodiment, the amount of cationic polymer that contacts the waste water is from 5 mg/L to 10,000 mg/L (mg/L refers to milligrams of polymer per one liter of waste water). In a further embodiment, the amount of cationic polymer that contacts the waste water is from 50 mg/L to 1,000 mg/L, e.g., 100-750 mg/L, about 100 mg/L, about 500 mg/L, or about 750 mg/L. The cationic polymer is typically not linked to a support material. In one specific embodiment, the cationic polymer is a polyDADMAC or polyamine sold under the BrennFloc designation from Brenntag (Reading, PA, U.S.A.).

In a specific embodiment, the cationic polymer is a polydiallyldimethyl ammonium having the following repeating unit:

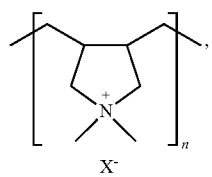

where X is halide, $BF_4$, or $PF_6$. A suitable example is polyDADMAC, which includes a chloride counterion. Alternatively or in addition to the polydiallyldimethyl ammonium, in this specific embodiment, the cationic polymer can be a polyamine having the following repeating unit:

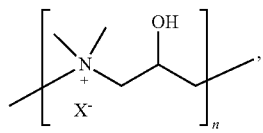

where X is halide, $BF_4$, or $PF_6$, e.g., Cl.

In this specific embodiment that uses a polydiallyldimethyl ammonium or a polyamine, the PFAS class can include any PFAS but in some embodiments the PFAS class can contain species with two to eighteen carbons. In further embodiments, the polydiallyldimethyl ammonium or polyamine can be particularly effective at removing a perfluorosulfonic acid, a perfluorosulfonate, a perfluorocarboxylic acid, or a perfluorocarboxylate having a chain length of six carbons or greater, e.g., six to fourteen. Examples include PFHxS, PFHpS, PFOS, PFNS, PFDS, PFDoS, PFHxA, PFHpA, PFOA, PFNA, PFDA, PFUnDA, PFDoDA, and PFTrDA, as well as deprotonated forms of these acids. In a further embodiment, the cationic polymer includes a polydiallyldimethyl ammonium (e.g., polyDADMAC), and the PFAS component includes a short-chain alkyl component, e.g., from four to six carbons; such as PFBA, PFBS, PFPeA, PFPeS, PFHxA, or an anionic salt thereof. In another embodiment, the cationic polymer includes a polyamine, such as the polydimethyl amine shown above having a quaternary nitrogen, and the PFAS component has six to fourteen carbons; such as PFHxS, PFHpS, PFOS, PFNS, PFDS, PFDoS, PFHxA, PFHpA, PFOA, PFNA, PFDA, PFUnDA, PFDoDA, PFTrDA, or an anionic salt thereof.

The gas bubbled through the waste water can be any suitable gas. In one embodiment, the gas comprises air, such as ambient air. In a further embodiment, the gas comprises ozone, e.g., air in combination with ozone. In another embodiment, the gas comprises nitrogen, meaning nitrogen in pure enough form as to be distinguished from the nitrogen content in air, such as at least 80%, at least 90%, or at least 95% by mole fraction pure nitrogen. In one embodiment, gas is bubbled into the waste water through a diffused gasification process, e.g., aeration. In a further embodiment, the amount of gas used is from 10 to 1,000 standard cubic feet per minute (SCFM) per 1,000 cubic feet of waste water.

Gas bubbles diffused through the waste water can in some embodiments be of a smaller size (e.g., several microns) or in other instances can be larger bubbles. For example, the bubbles can have a size ranging from 1-1,000 microns or larger. Further specific examples include bubbles having a size of 50-500 microns or larger. In one embodiment, the method does not further comprise an oxidation treatment of the PFAS component. In addition, in one embodiment, the process can include a dissolved air flotation system in which bubbles are produced when the dissolution of air in water occurs under high pressure. Dissolved air flotation systems can range from circular basin designs equipped with a configuration of submersible nozzles, which bubble pressurized air up through a stagnant or near stagnant pool of wastewater, to dynamic systems designed with multiple compartments, which capitalize on difference water retention times in each compartment.

The flow rate of the gas bubble generation can vary. In one embodiment, the flow rate or amount of gas used is from 10 to 10,000 standard cubic feet per minute (SCFM) per 1,000 cubic feet of waste water. In a further embodiment, the gas flow rate is from 100-500 SCFM/1,000 $ft^3$ of waste water. In another embodiment, the gas flow rate is from 125-500 SCFM/1,000 $ft^3$, e.g., 125-250 SCFM/1,000 $ft^3$ of waste water.

The PFAS removal method is highly effective at removing PFAS from wastewater, including landfill leachate. In some embodiments, the method has a PFAS removal efficiency of at least 90%, at least 95%, or at least 99%. In one embodiment, the PFAS comprises PFOA (or its anionic counterparts), and the removal efficiency of the PFOA (or its anionic counterparts) is at least 90%, at least 95%, or at least 99%. In another embodiment, the PFAS comprises PFOS (or its anionic counterparts), and the removal efficiency is at least 90%, at least 95%, or at least 99%.

In specific embodiments, the gas bubbled through the waste water comprises air, ozone, or nitrogen (e.g., a gas comprising at least 80%, at least 90%, or at least 95% by mole fraction nitrogen), and:
 a) the cationic polymer is selected from:
  i) a polydiallyldimethyl ammonium having the following repeating unit:

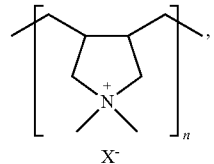

where X is an anion such as halide, $BF_4$, or $PF_6$, e.g., polyDADMAC;
  ii) a polyamine having the following repeating unit:

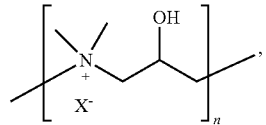

where X is an anion such as halide, $BF_4$, or $PF_6$, e.g., Cl;
  iii) a polyacrylamide having the following repeating unit:

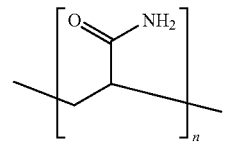

together with a cationic repeating unit (e.g., an ammonium, phosphonium, or sulfonium repeating unit);

iv) a polyacrylic acid having the following repeating unit:

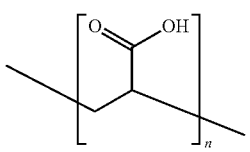

together with a cationic repeating unit (e.g., an ammonium, phosphonium, or sulfonium repeating unit); or v) any combination from these four classes of cationic polymers;

b) the amount of the cationic polymer per liter of waste water is from 100-1,000 mg/L, e.g., 100-750 mg/L, about 100 mg/L, about 500 mg/L, or about 750 mg/L;

c) the flow rate of the gas, e.g., air, bubbled through the waste water is at least 100 SCFM/1,000 ft$^3$ of waste water, e.g., 100-1,000 SCFM/1,000 ft$^3$, 100-500 SCFM/1,000 ft$^3$, or 100-250 SCFM/1,000 ft$^3$;

d) the PFAS component comprises a perfluorosulfonic acid, a perfluorosulfonate, a perfluorocarboxylic acid, or a perfluorocarboxylate, e.g., PFAS component having from four to six carbons, such as PFBA, PFBS, PFPeA, PFPeS, PFHxA; or an anion or anionic salt thereof, or a PFAS component having from six to fourteen carbons, such as PFHxS, PFHpS, PFOS, PFNS, PFDS, PFDoS, PFHxA, PFHpA, PFOA, PFNA, PFDA, PFUnDA, PFDoDA, PFTrDA; or an anion or anionic salt thereof, and e) the removal efficiency of at least one PFAS component from the waste water is at least 90%, including up to 99% or greater.

C. Examples

The following examples further illustrate this disclosure. The scope of the disclosure and claims is not limited by the scope of the following examples.

1. PFAS Treatment for Landfill Leachate Using Cationic Polymers

PFAS were removed from a landfill leachate sample in this study using polyamine or polyDADMAC coagulants according to the testing conditions shown in Table 2. A raw leachate refers to a landfill leachate sample without any treatment by aeration or coagulant addition, whereas the control run was performed with aeration but without any coagulant dosing. The leachate tested was highly concentrated in PFAS from a specific sump from a landfill. Brenn-Floc polymer coagulants were obtained from Brenntag (Reading, PA, U.S.A.).

TABLE 2

| | Testing Conditions | | | |
| --- | --- | --- | --- | --- |
| Sample | Gas Supply | Flow Rate | Coagulant Type | Coagulant Dose (mg/L) |
| Raw Leachate | — | — | — | — |
| Control | Air | 250 SCFM/ 1,000 ft$^3$ | — | — |

TABLE 2-continued

| | Testing Conditions | | | |
| --- | --- | --- | --- | --- |
| Sample | Gas Supply | Flow Rate | Coagulant Type | Coagulant Dose (mg/L) |
| Polyamine | Air | 250 SCFM/ 1,000 ft$^3$ | BrennFloc 9874 polyamine | 100 |
| PolyDADMAC | Air | 250 SCFM/ 1,000 ft$^3$ | BrennFloc 9984 PolyDADMAC | 100 |

Figure 3A:
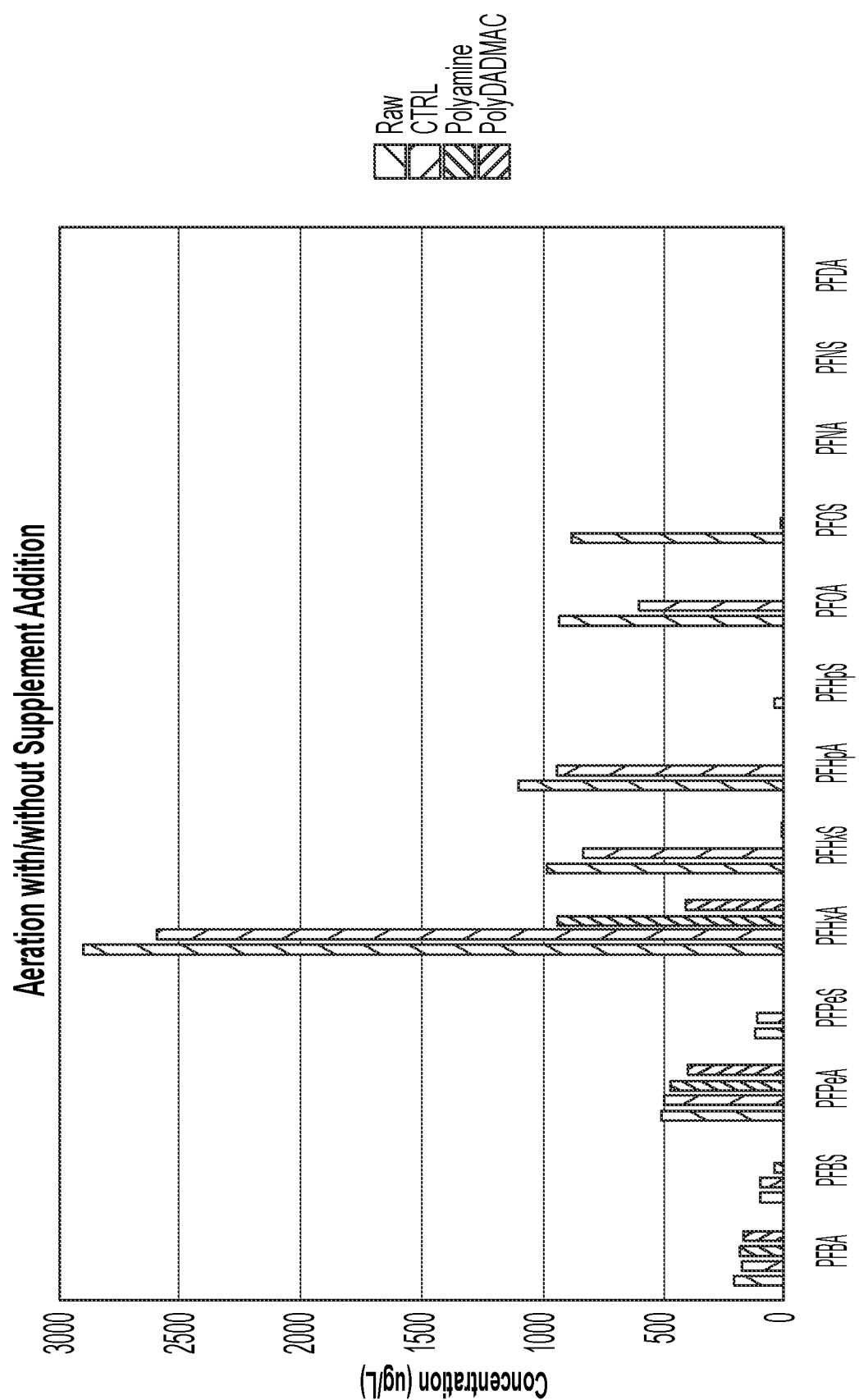
FIG. 3A is a bar graph showing removal of different PFAS from landfill leachate after treating the leachate with a cationic polymer and aeration.
Figure 3B:
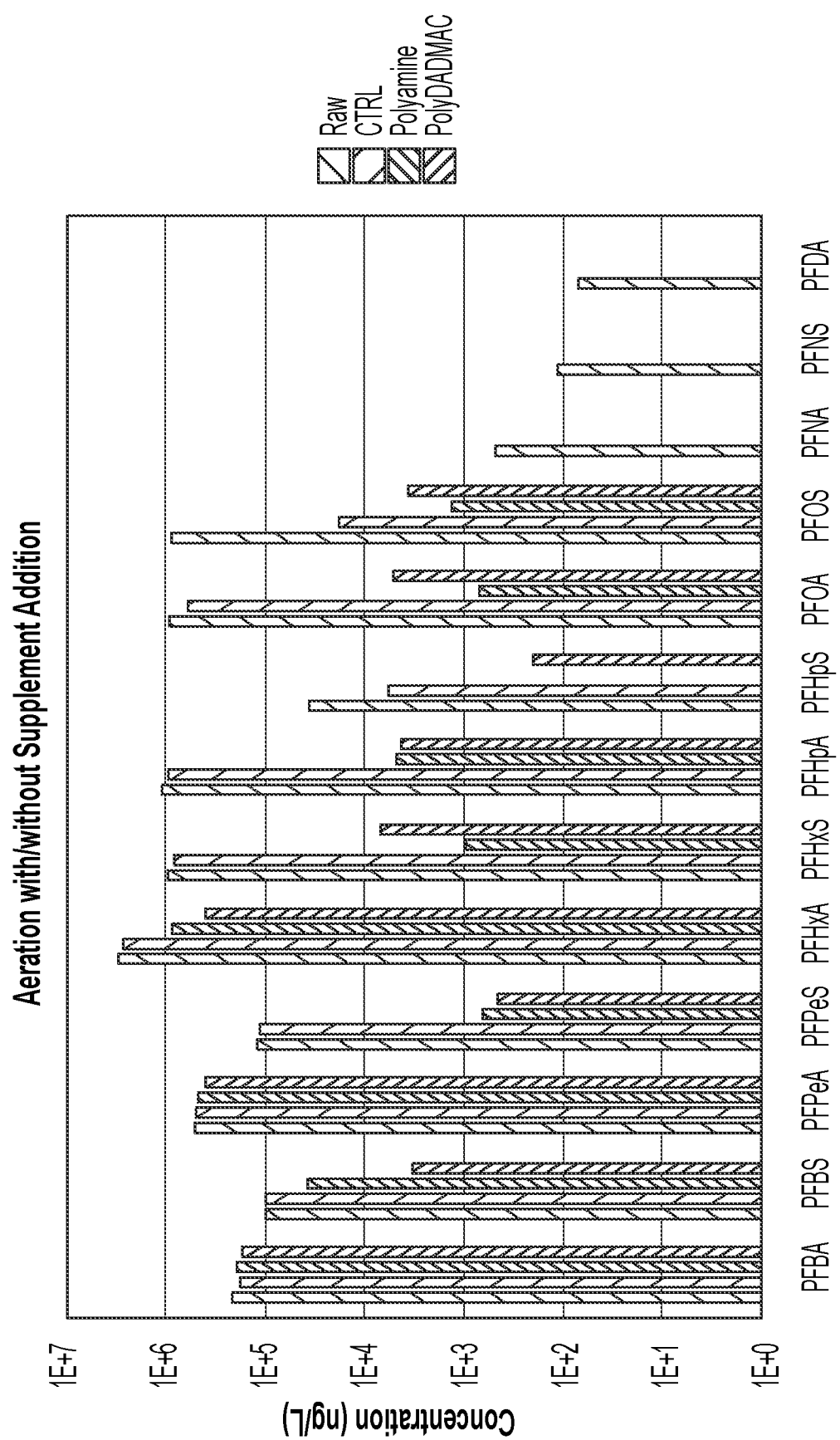
FIG. 3B is the same bar graph shown in FIG. 3A except with a modified y axis to better depict the magnitude of PFAS reduction from the leachate when treated with cationic polymer.

As shown in FIGS. 3A-3B, the method works with leachate having high PFAS concentrations. In general, the addition of the cationic polymeric coagulant enhanced PFAS removal, especially for sulfonates and carboxylates having a chain length of six carbons or greater. FIG. 3A shows that aeration alone (raw leachate vs. control run with aeration but no coagulant addition) can be effective in PFOS, PFNA, PFNS, and PFDA removal. By adding the cationic polymeric coagulant, however, removal of all detectable PFAS was enhanced by three orders of magnitude relative to the control. PFNA, PFNS, and PFDA were removed to below detection limits after aeration.

2. Gas Supply Studies

Figure 4A:
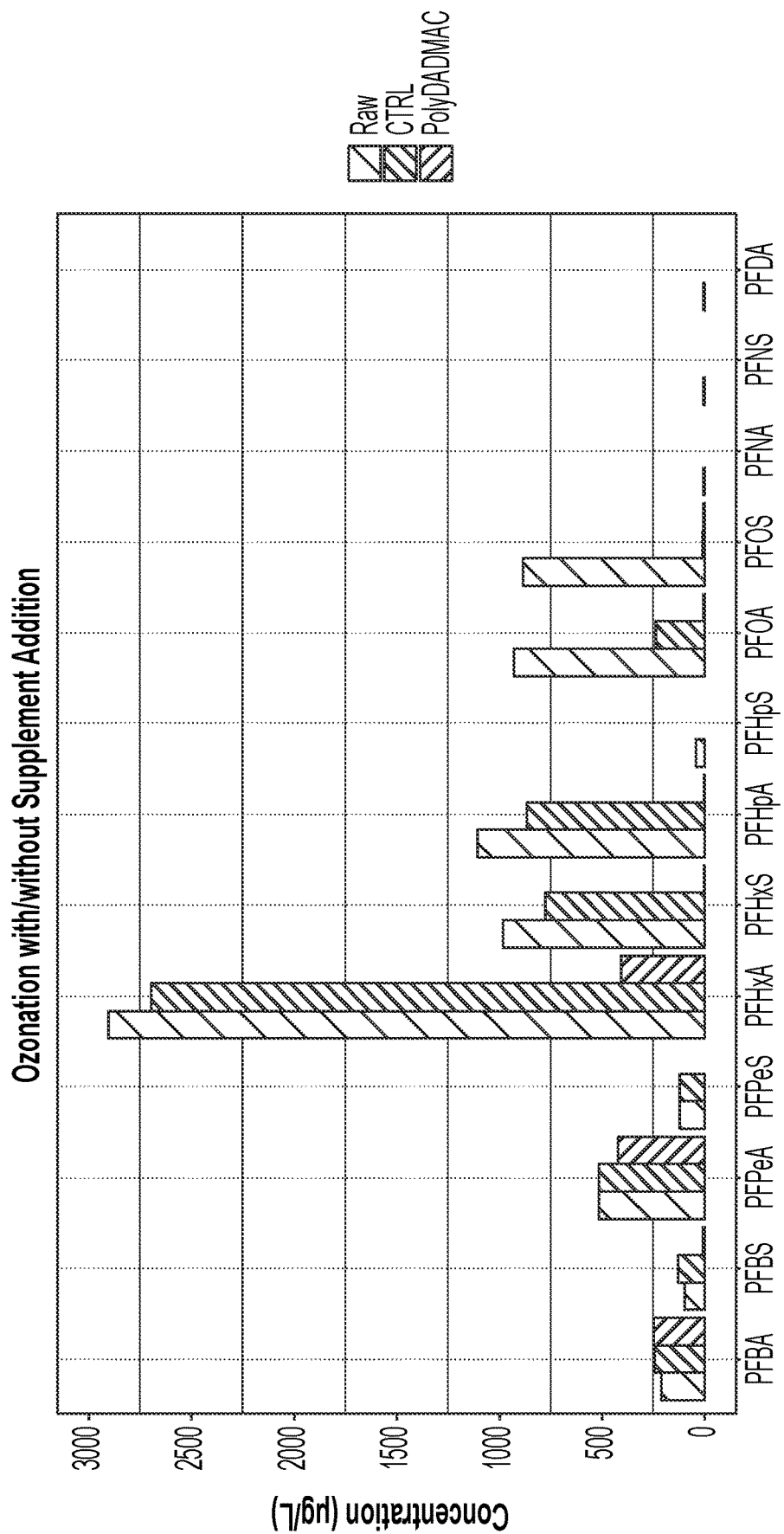
FIG. 4A is a bar graph showing reduction of various PFAS in leachate after treating the leachate with a PolyDADMAC using ozone in the gas supply.
Figure 4B:
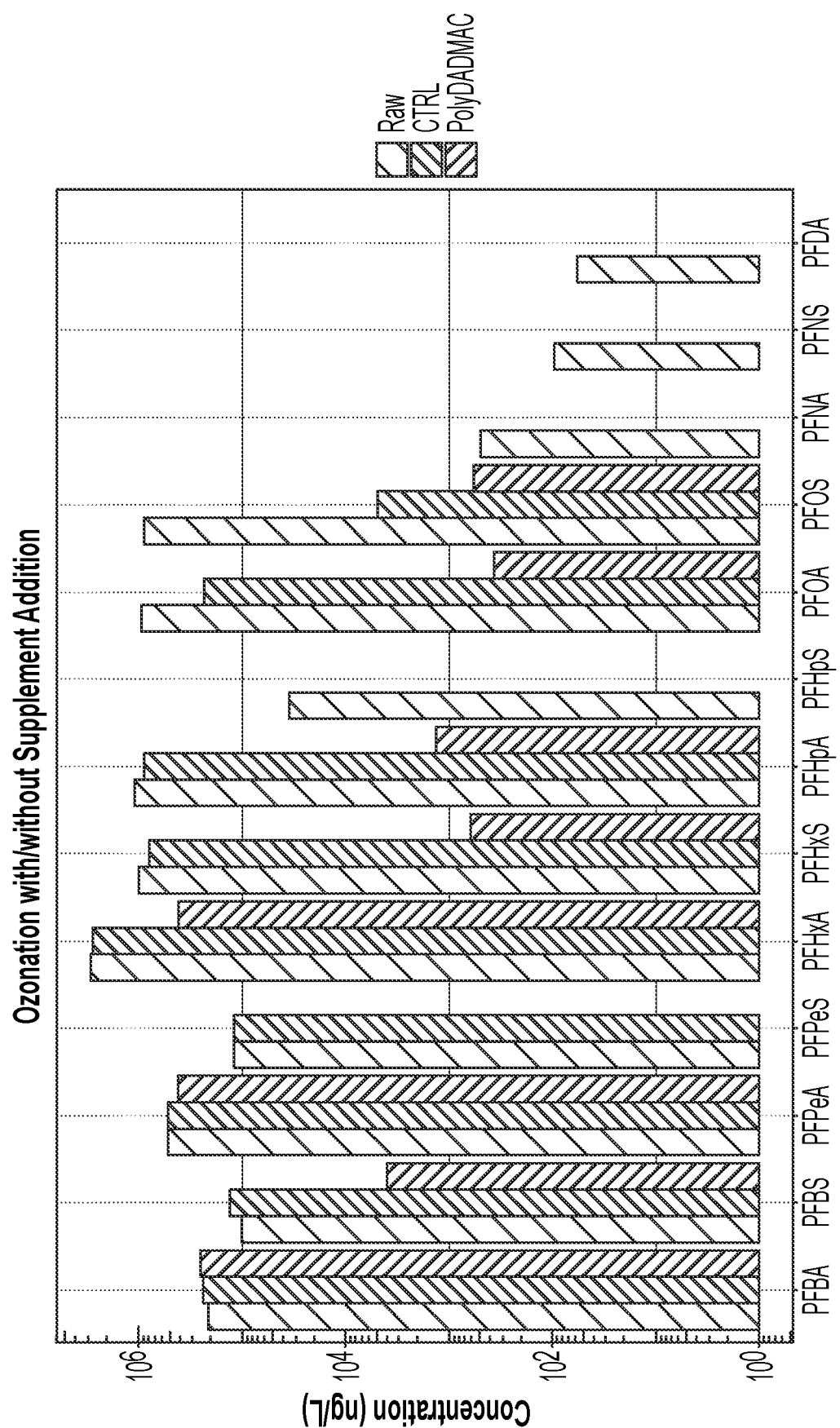
FIG. 4B is the same bar graph shown in FIG. 4A except with a modified y axis to better depict the magnitude of PFAS reduction from the leachate when treated with Poly-DADMAC.

By comparing the raw run to the ozone control run, it was found that ozone itself can remove longer-chain PFAS. Compared to raw leachate, however, ozonation increased PFBA and PFBS concentrations, possibly due to the oxidation of PFAS precursors. As shown in FIGS. 4A-4B, Poly-DADMAC enhanced PFAS removal when the gas supply included ozone.

Figure 5A:
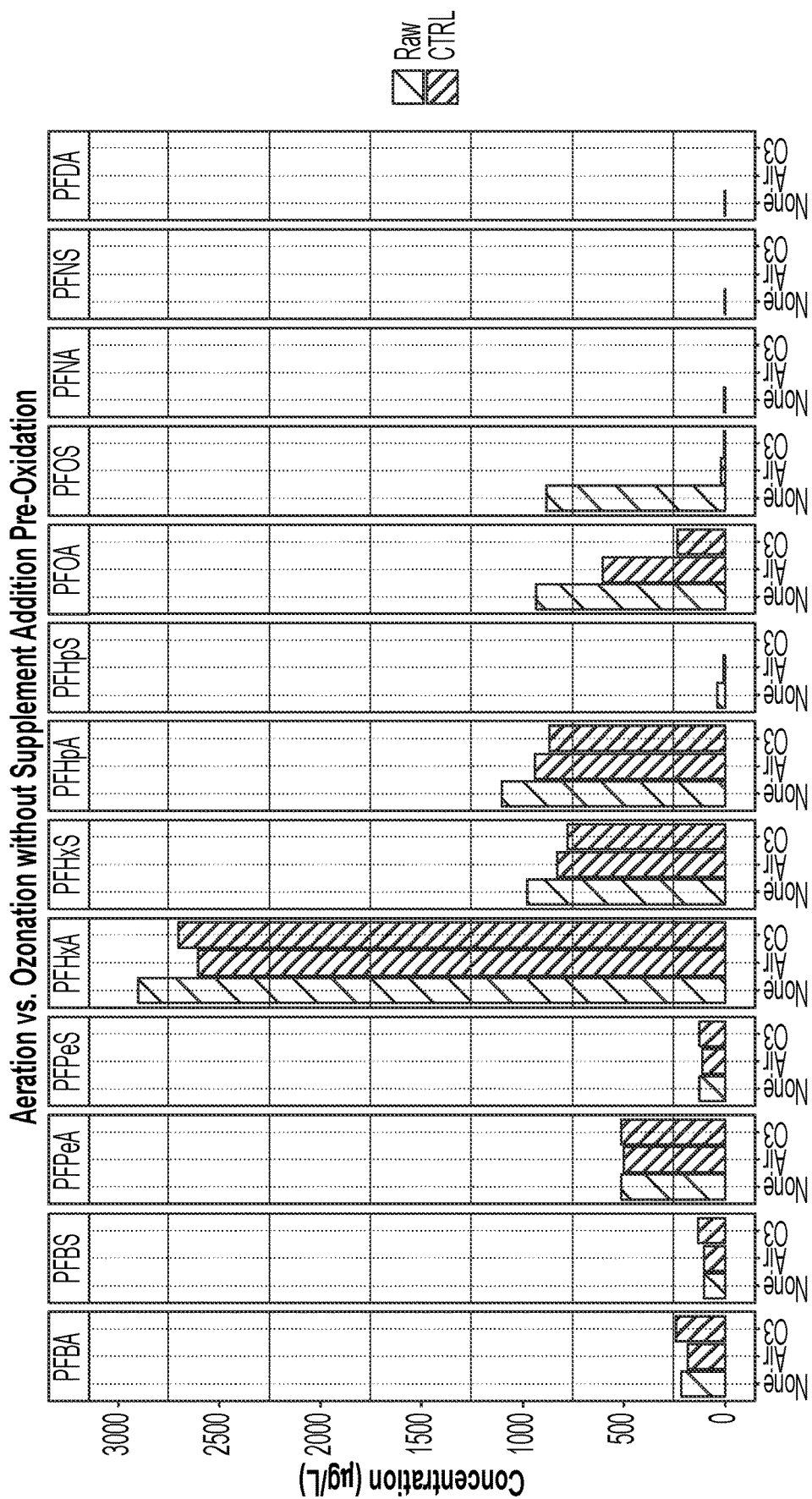
FIG. 5A is a bar graph showing reduction of various PFAS in leachate (pre-oxidation) without any coagulant treatment but with a gas supply comprising either air or ozone, compared to the raw control sample.
Figure 5B:
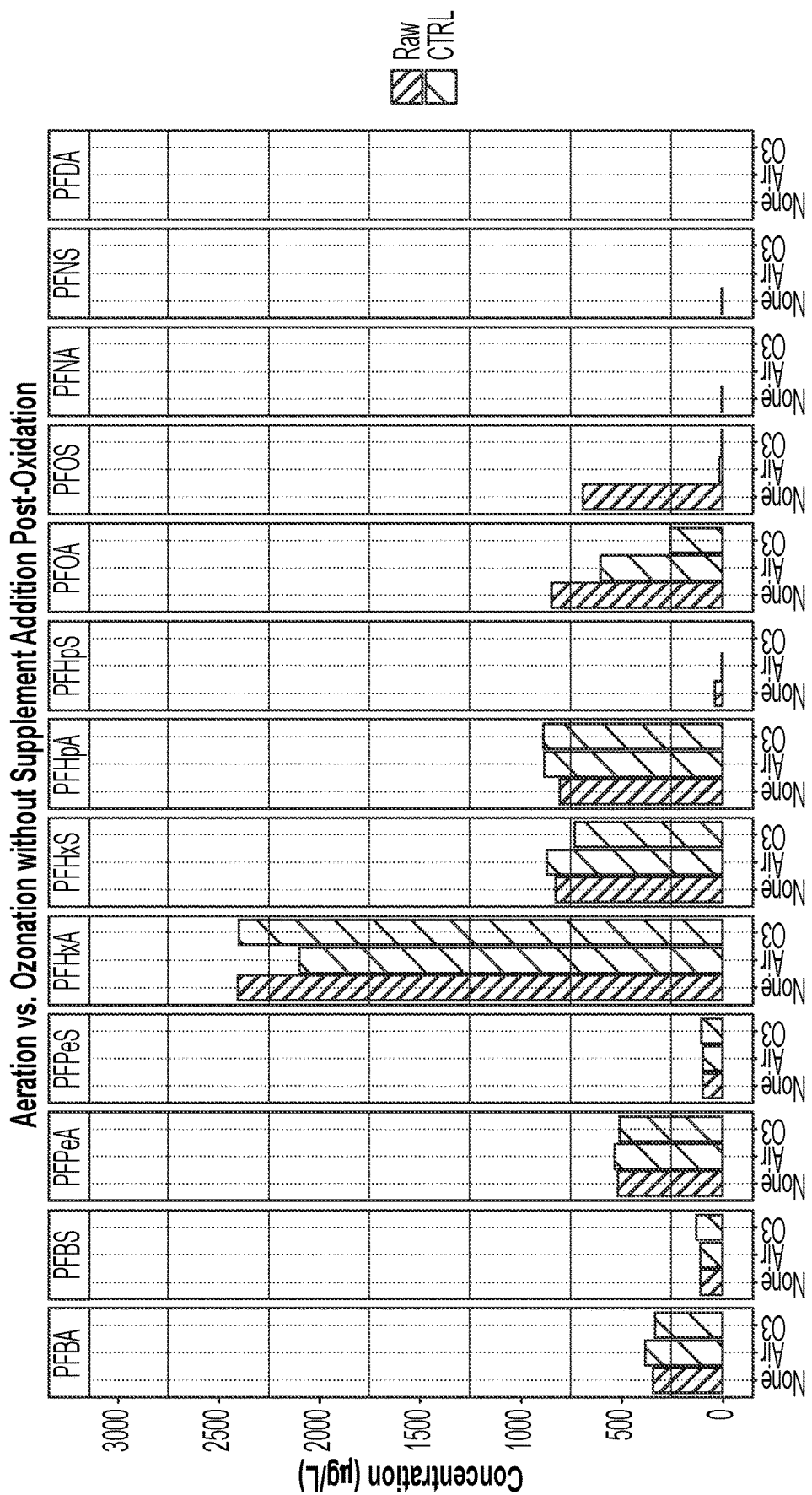
FIG. 5B is a bar graph showing reduction of various PFAS in leachate (post-oxidation) without any coagulant treatment but with a gas supply comprising either air or ozone, compared to the raw control sample.

A gas supply comprising air was also compared to a gas supply comprising ozone, but without the addition of any flocculant. As shown in FIGS. 5A-5B, air resulted in more removal of PFBA, PFBS, PFPeA, PFPeS, and PFHxA (≤C6), while ozone resulted in more removal of PFHxS, PFHpA, PFHpS, PFOA, and PFOS ($\geq C_6$). These trends were observed for leachate samples both pre- and post-oxidation.

3. PolyDADMAC Studies

Figure 6A:
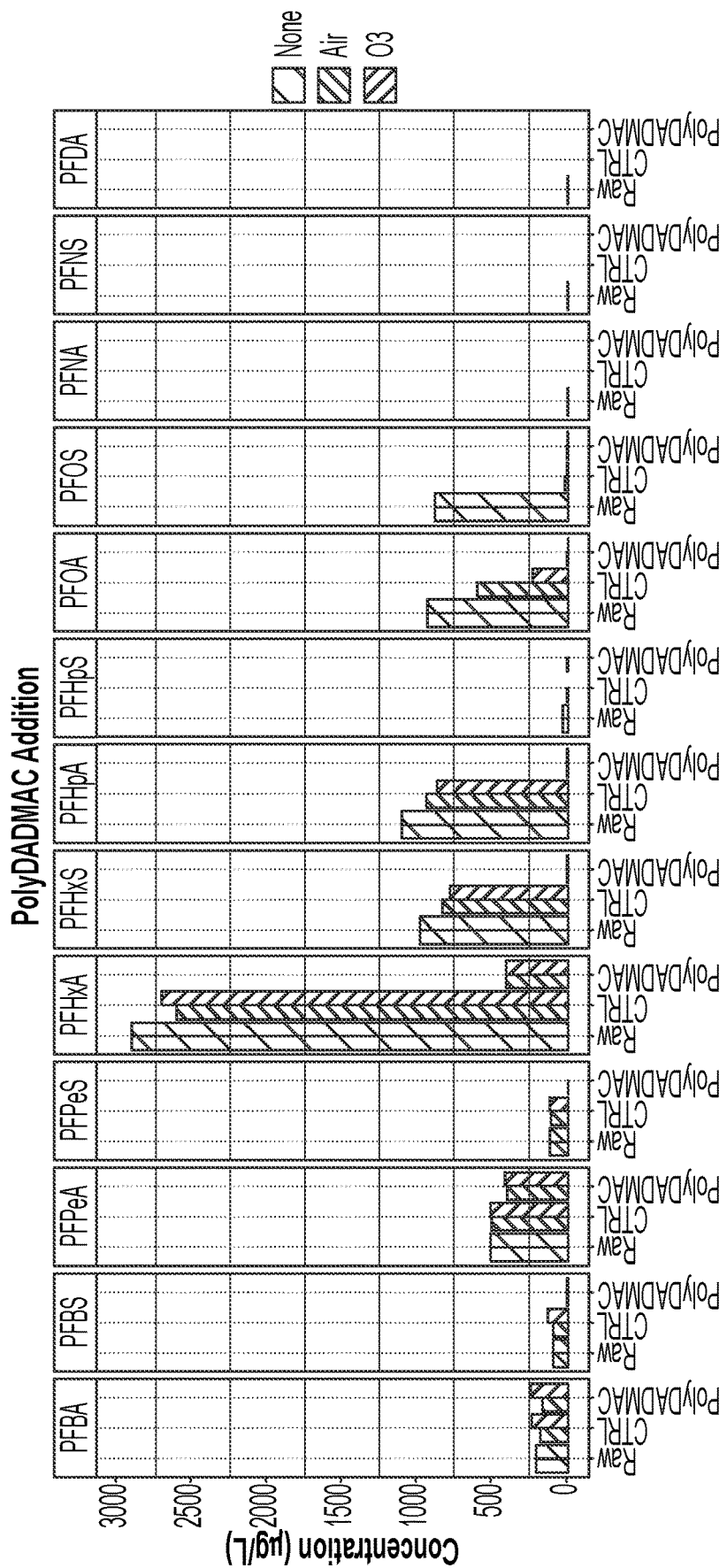
FIG. 6A is a bar graph showing the change in PFAS concentration in leachate after treating with PolyDADMAC, compared to both raw and control samples.
Figure 6B:
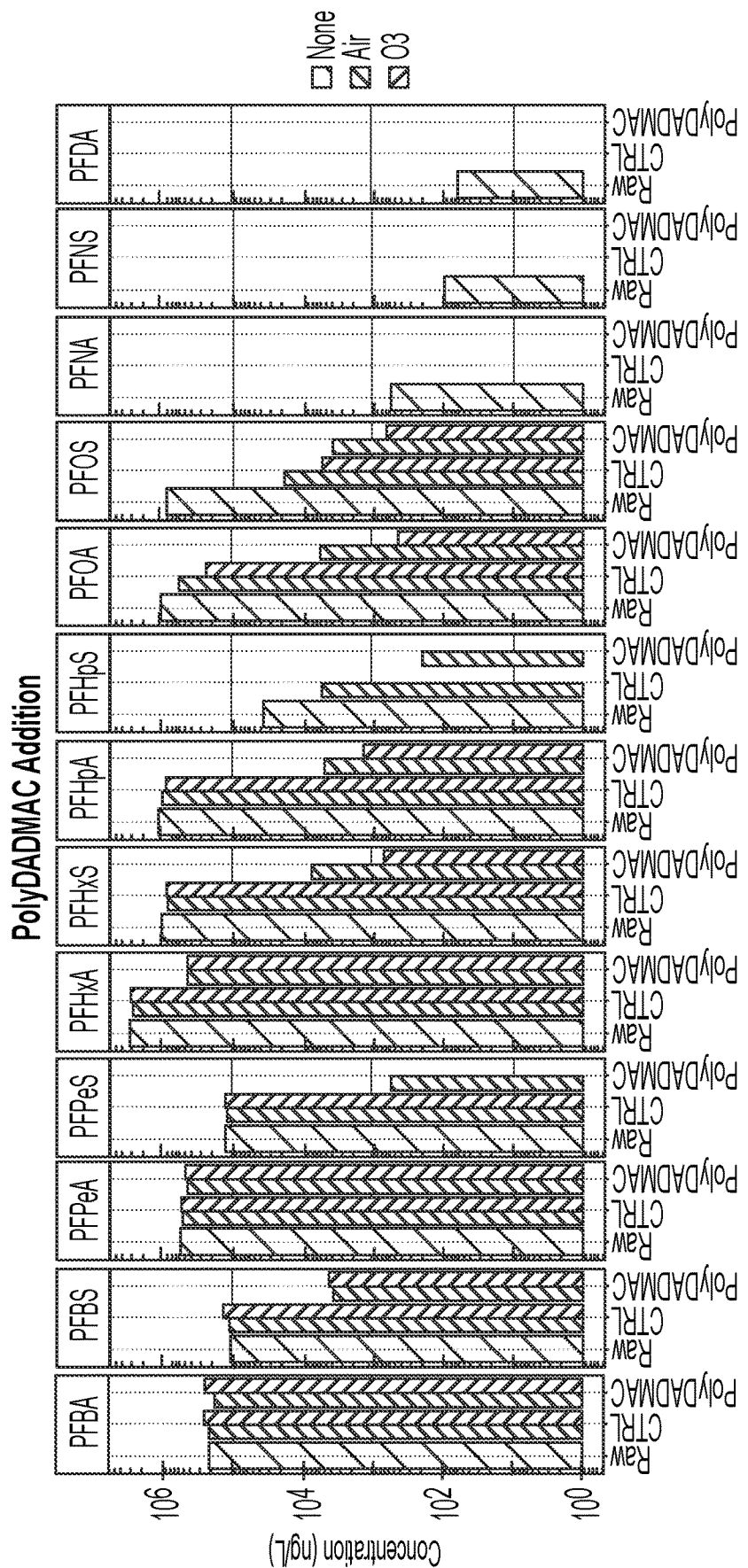
FIG. 6B is the same bar graph shown in FIG. 6A except with a modified y axis to better depict the magnitude of PFAS reduction.

Compared to the air control run, the addition of Poly-DADMAC enhanced all PFAS removal except for PFBA, as shown in FIGS. 6A-6B. In addition, it was found that ozone when combined with PolyDADMAC was effective in the removal of longer chain PFAS (≥PFHxS).

Figure 7A:
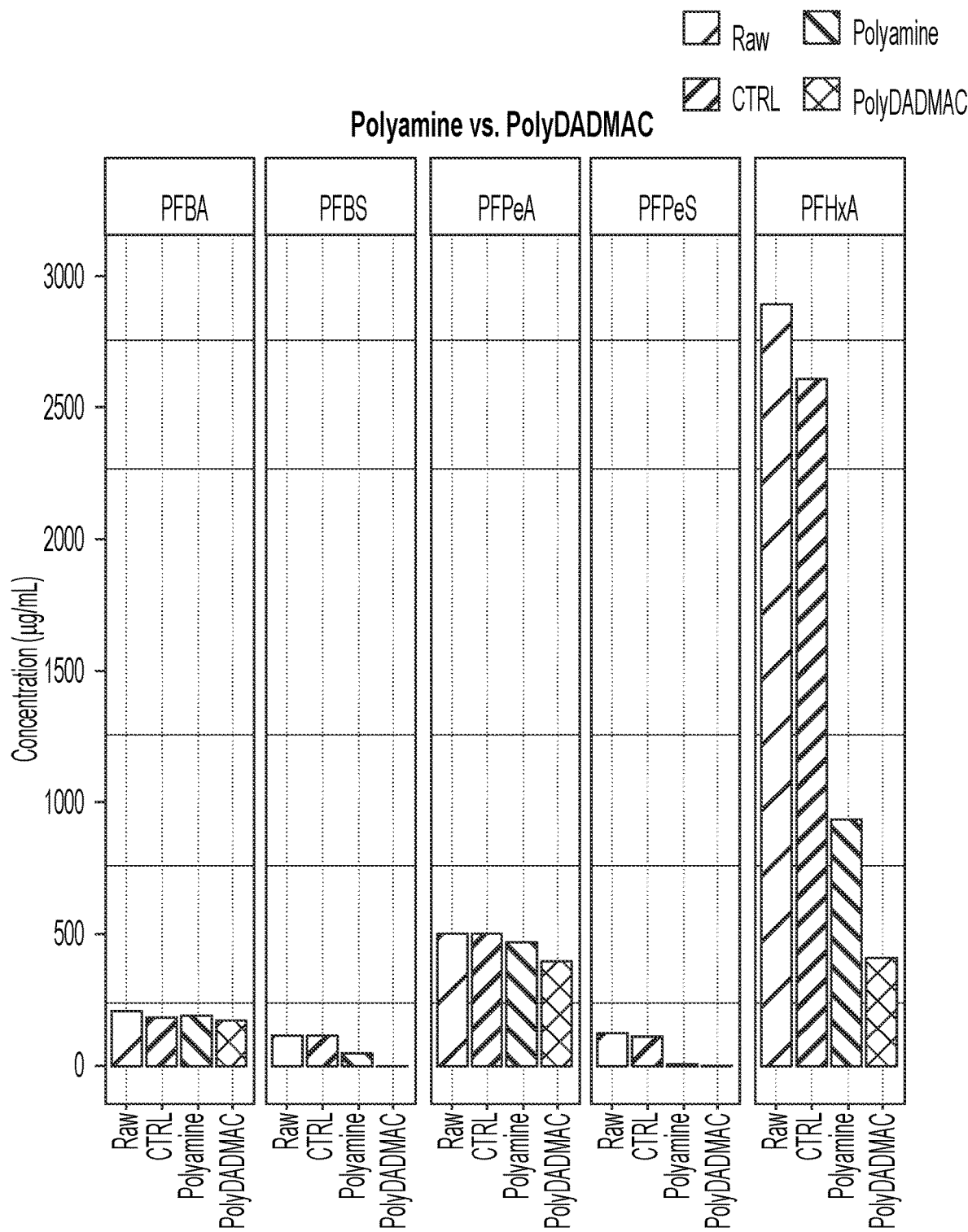
Figures 1, 7A:
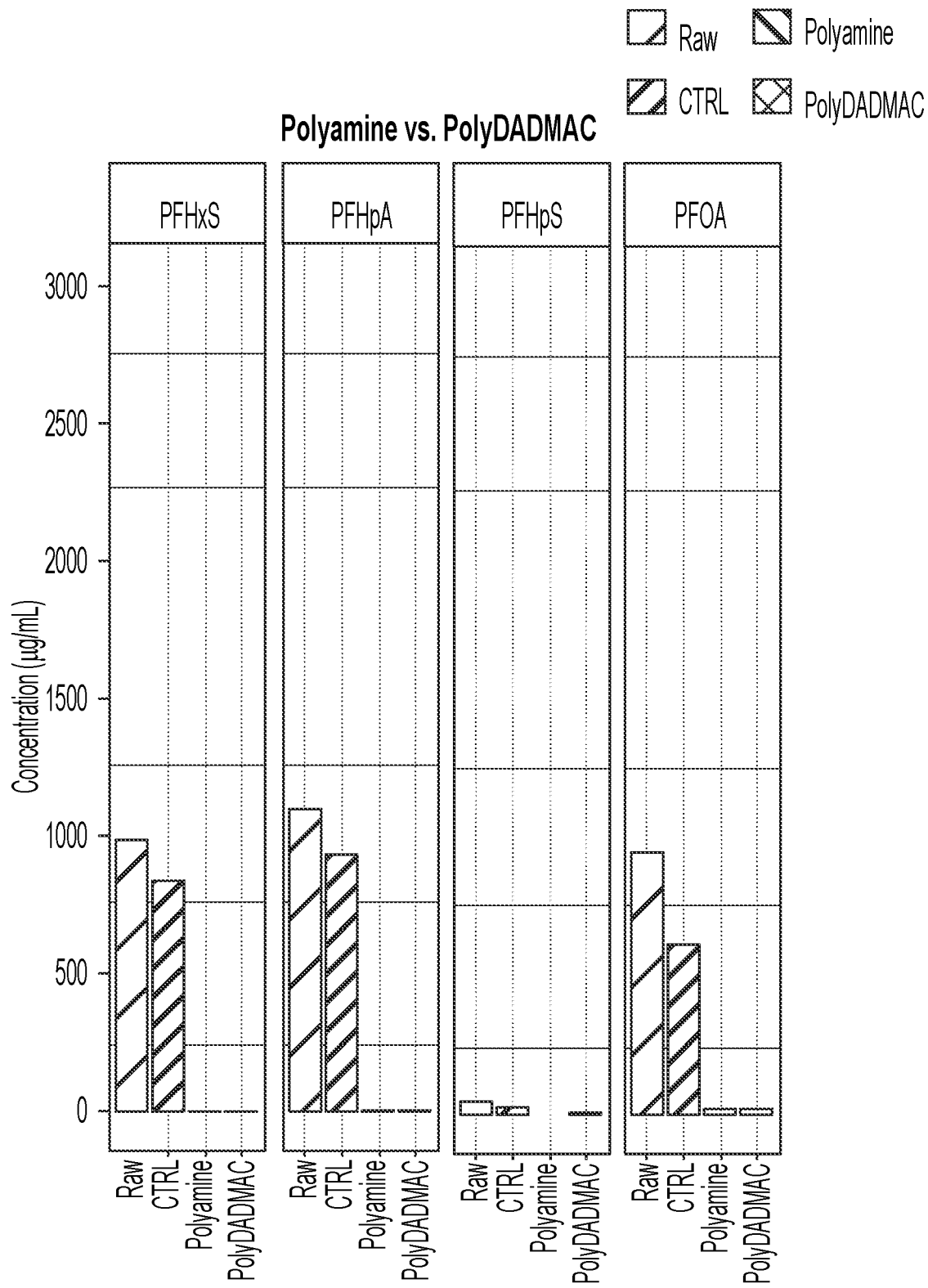
Figures 2, 7A:
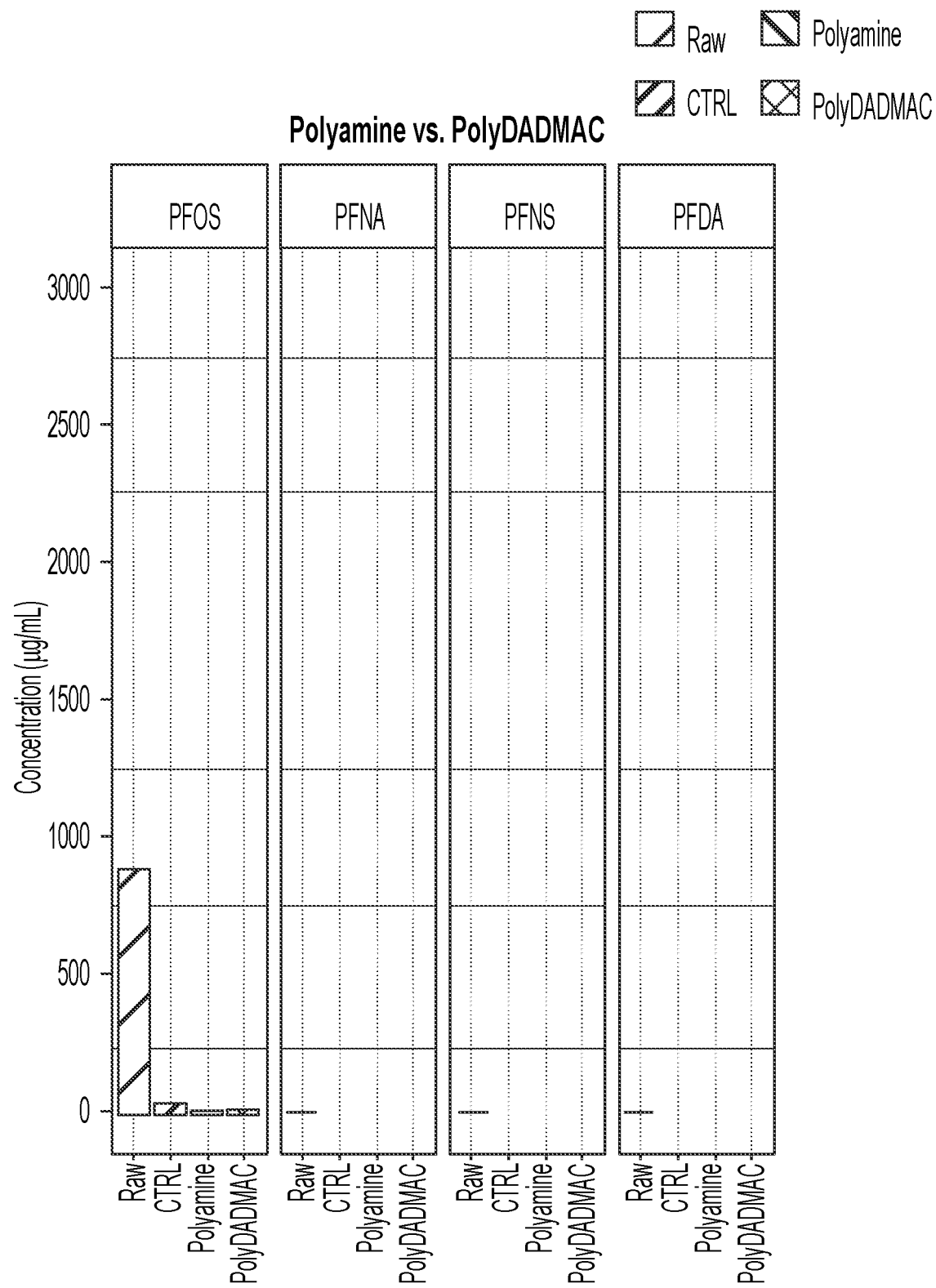
Figure 7B:
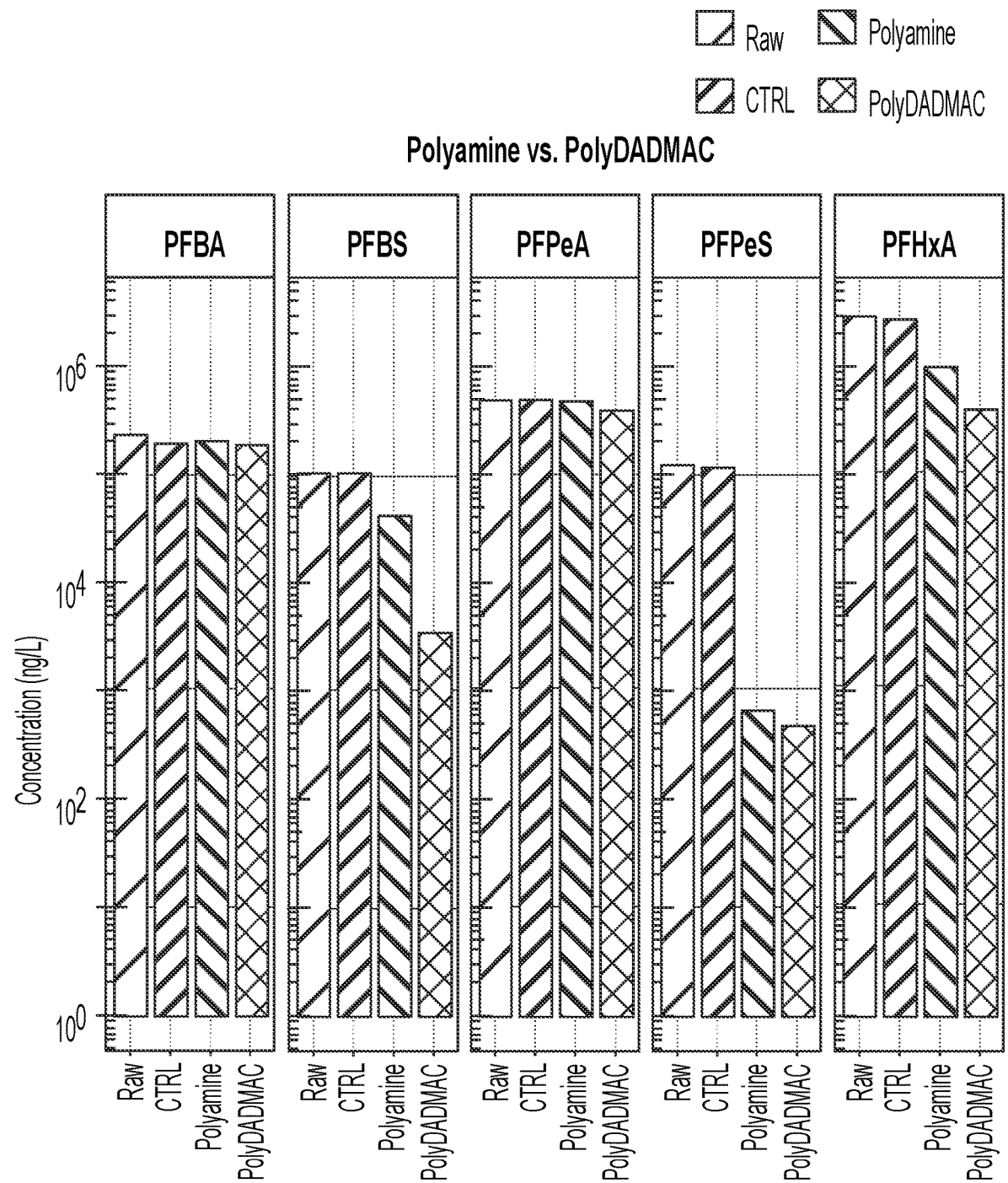
Figures 1, 7B:
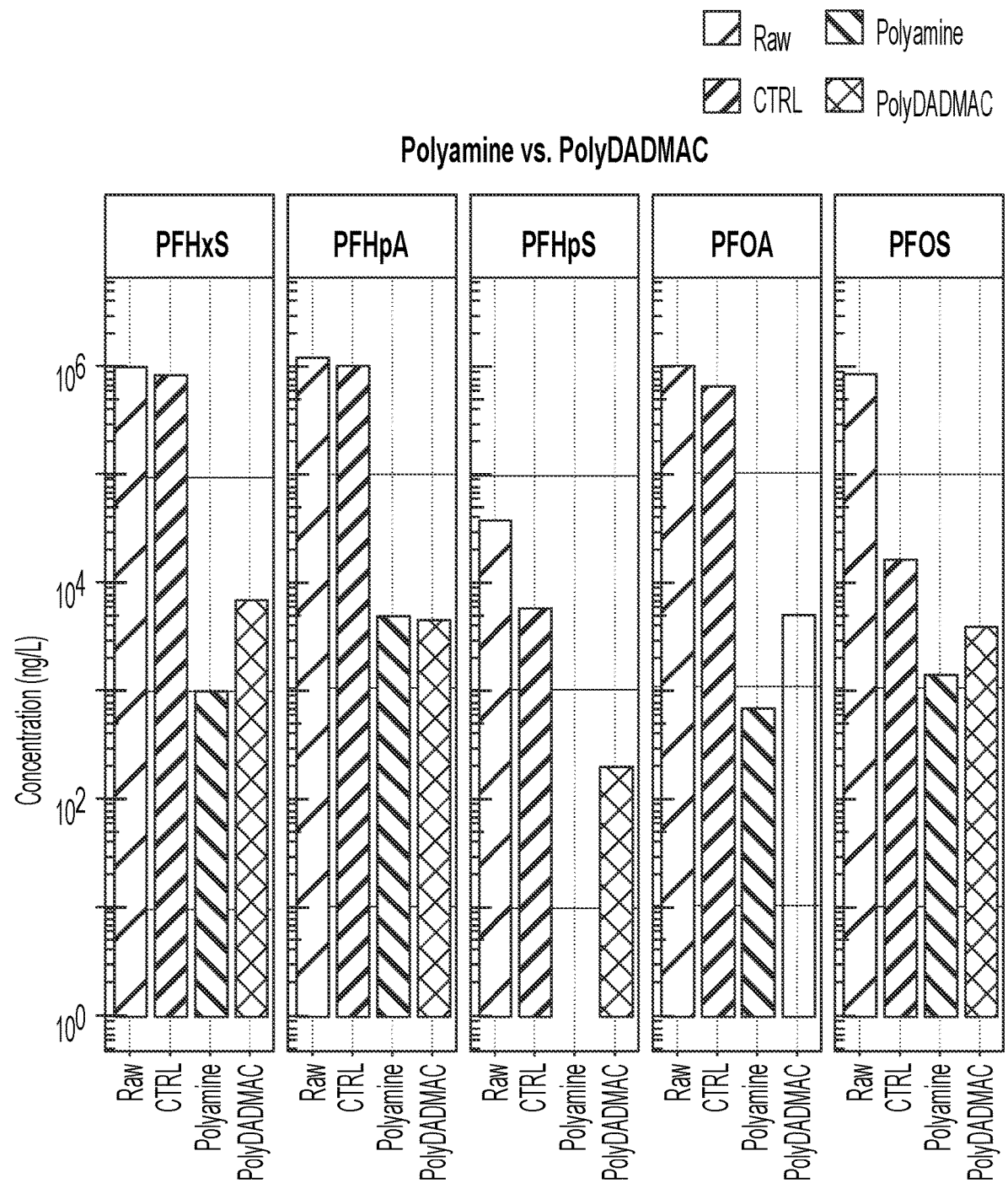
Figures 2, 7B:
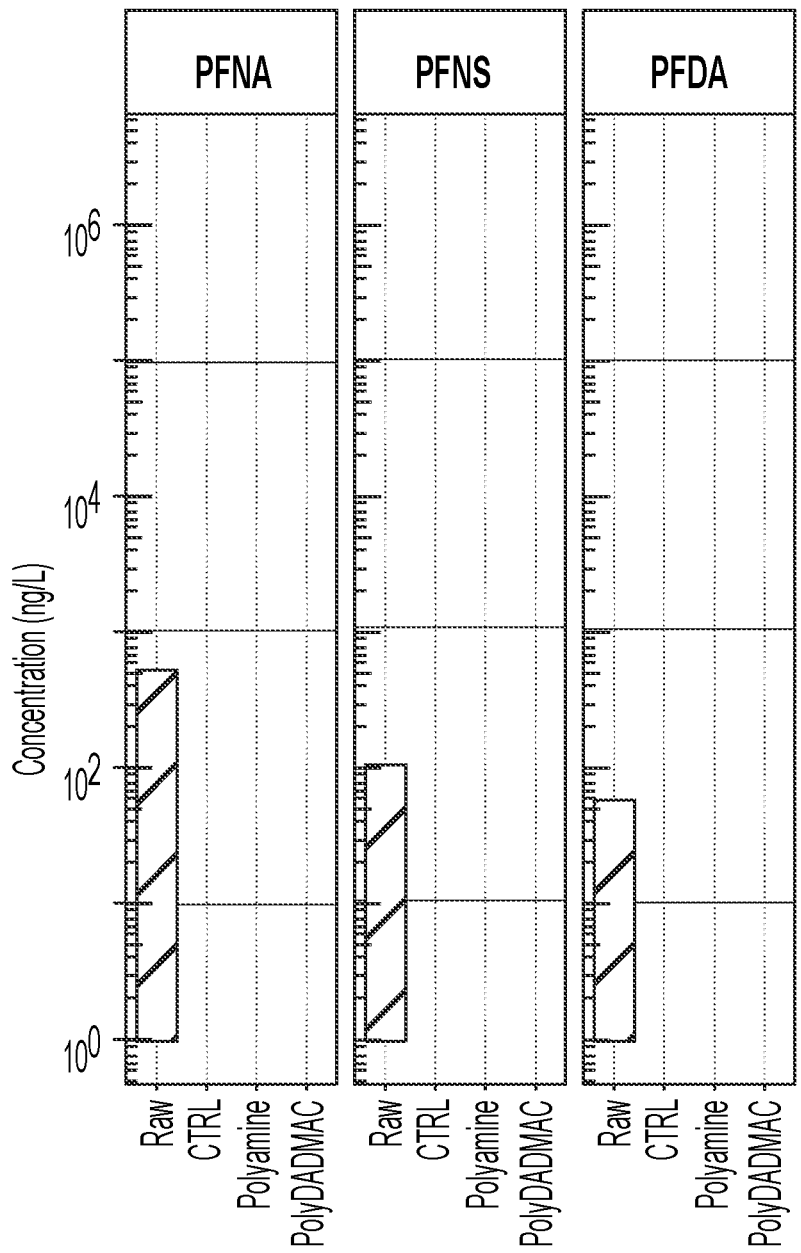
Figure 8:
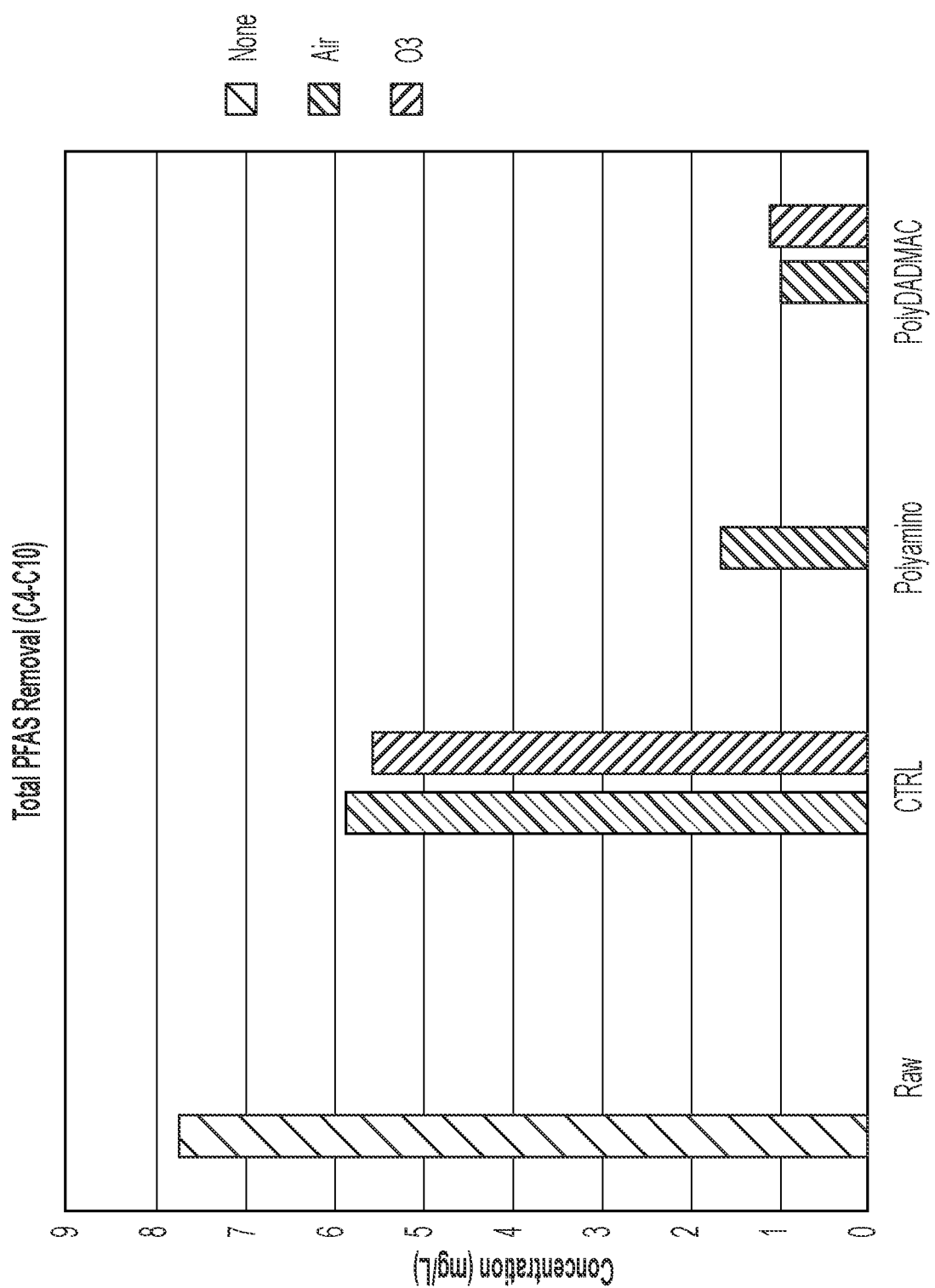
FIG. 8 is a bar graph showing total $C_4$-$C_{10}$ PFAS removal for raw, control, polyamine, and PolyDADMAC runs.
Figure 9A:
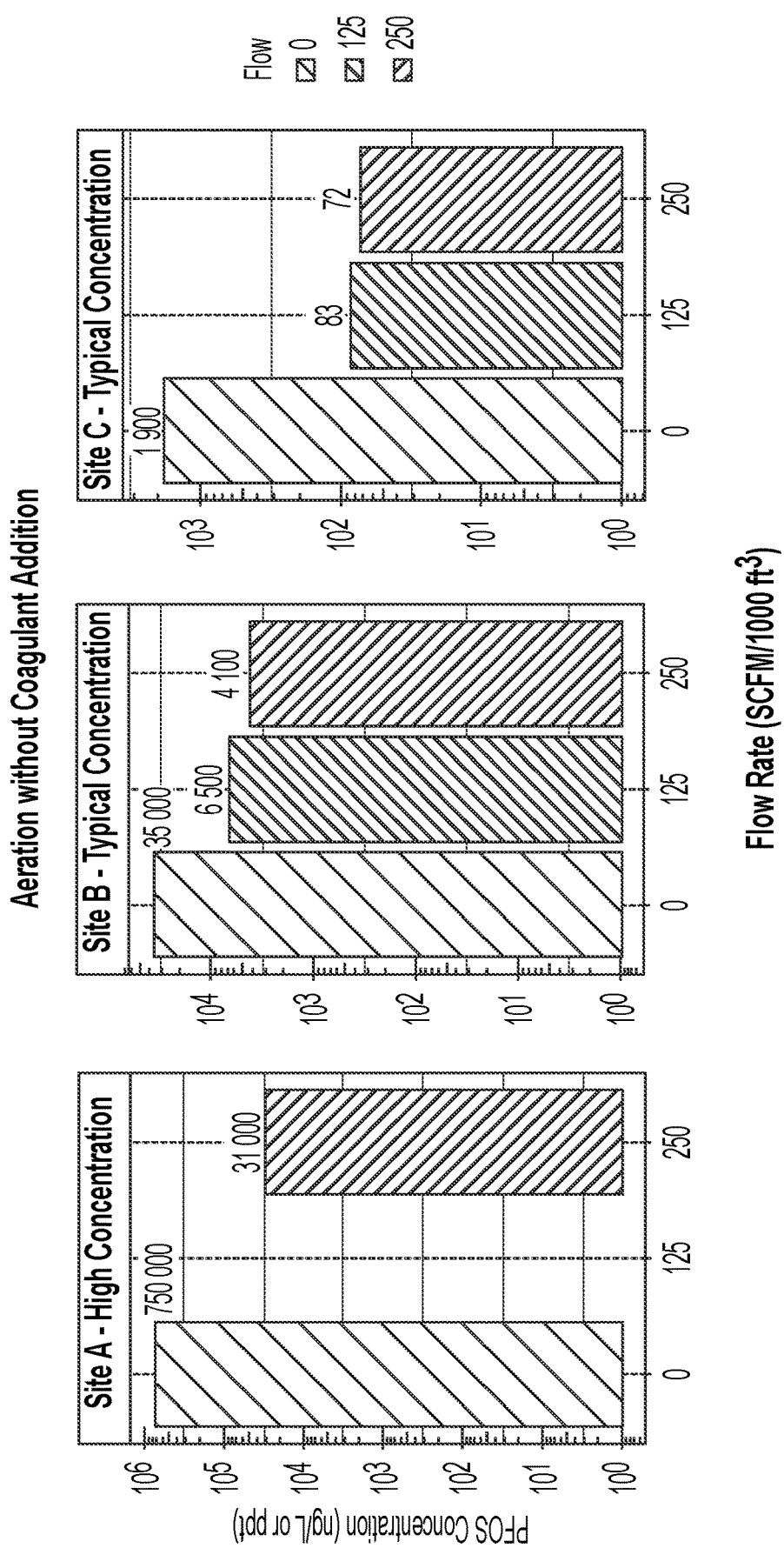
FIG. 9A is a bar graph showing PFOS removal on a log-scale with air control runs (i.e., without the addition of cationic polymer).
Figure 9B:
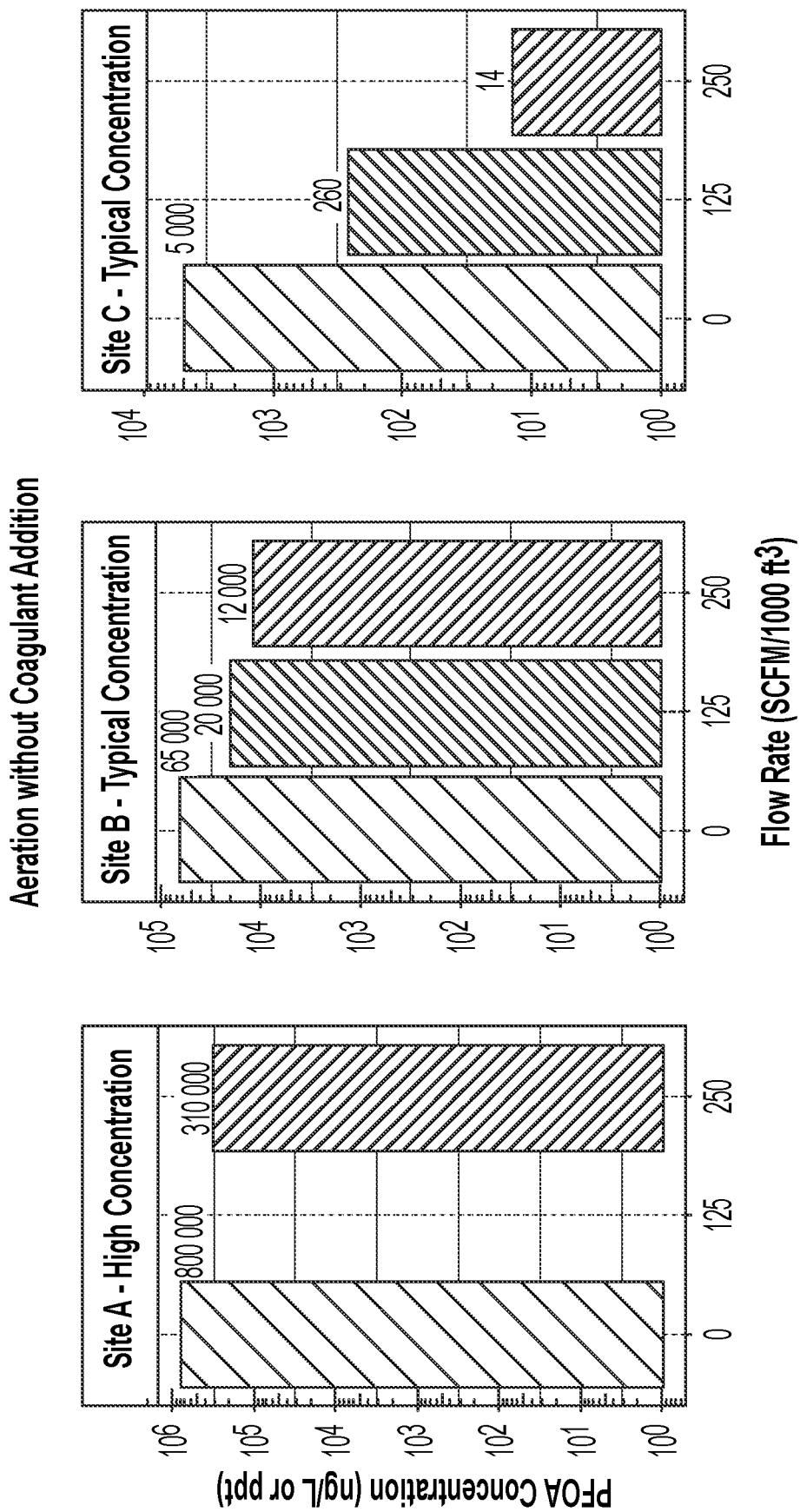
FIG. 9B is a bar graph showing PFOA removal on a log-scale with air control runs (i.e., without the addition of cationic polymer).

As shown in FIGS. 7A-7B, PolyDADMAC was more effective than polyamine in removing shorter-chain PFAS for the particular sump sample tested (e.g., PFBA, PFBS, PFPeA, PFPeS, PFHxA). Similarly, polyamine was more effective than PolyDADMAC in removing longer-chain PFAS (≥PFHxS). For PFAS of the same chain length, both flocculants removed more sulfonate than carboxylate species, except for PFOA and PFOS. In general, performance of PolyDADMAC versus polyamine depends on the particular sample matrix. FIG. 8 shows total PFAS removal for $C_4$-$C_{10}$ PFAS for raw, control, polyamine, and PolyDADMAC runs.

4. Additional Studies

Additional testing was performed to identify potential factors that impact treatment performance. A set of experiments were performed on three different landfill leachate samples with PFAS concentrations ranging from several ng/L up to sub-mg/L, depending on sample type and PFAS species. Detailed testing conditions are listed in Table 3.

TABLE 3

Testing Conditions

| Sample | Air Flow Rate (SCMF/1,000 ft³) | Coagulant Type | Coagulant Dose (mg/L) |
|---|---|---|---|
| Leachate Site A | 125 | — | — |
|  |  | polyamine | 100 |
|  |  |  | 500 |
|  |  | polyDADMAC | 100 |
|  |  |  | 500 |
|  | 250 | — | — |
|  |  | polyamine | 100 |
|  |  |  | 500 |
|  |  | polyDADMAC | 100 |
|  |  |  | 500 |
| Leachate Site B | 125 | — | — |
|  |  | polyamine | 500 |
|  |  |  | 750 |
|  |  | polyDADMAC | 500 |
|  |  |  | 750 |
|  | 250 | — | — |
|  |  | polyamine | 500 |
|  |  |  | 750 |
|  |  | polyDADMAC | 500 |
|  |  |  | 750 |
| Leachate Site C | 125 | — | — |
|  |  | polyamine | 100 |
|  |  |  | 250 |
|  |  | polyDADMAC | 100 |
|  |  |  | 250 |
|  | 250 | — | — |
|  |  | polyamine | 100 |
|  |  |  | 250 |
|  |  | polyDADMAC | 100 |
|  |  |  | 250 |

5. Results and Discussion

Figure 10:
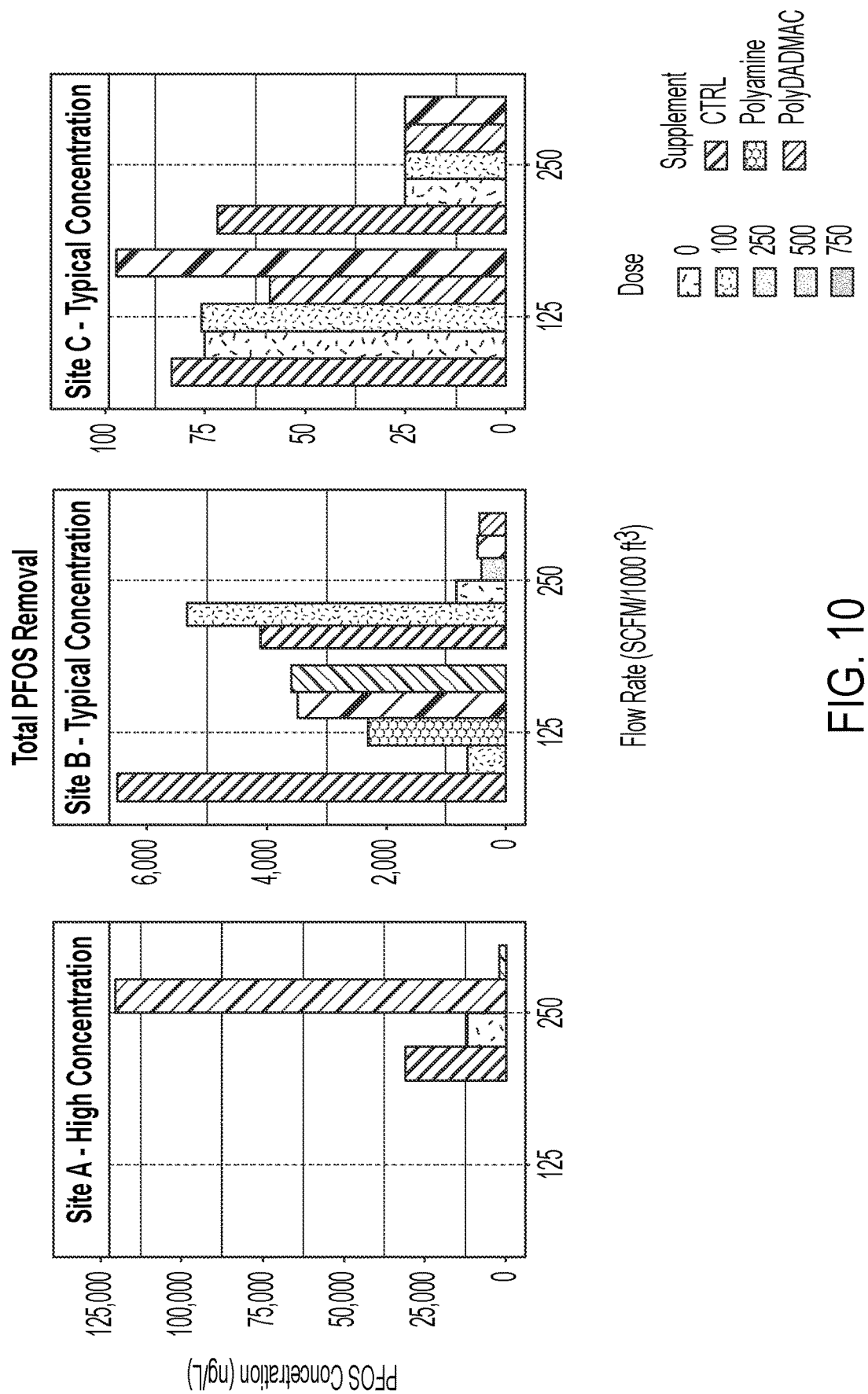
FIG. 10 is a bar graph showing PFOS removal for air control, polyamine, and PolyDADMAC runs on three different samples.
Figure 11:
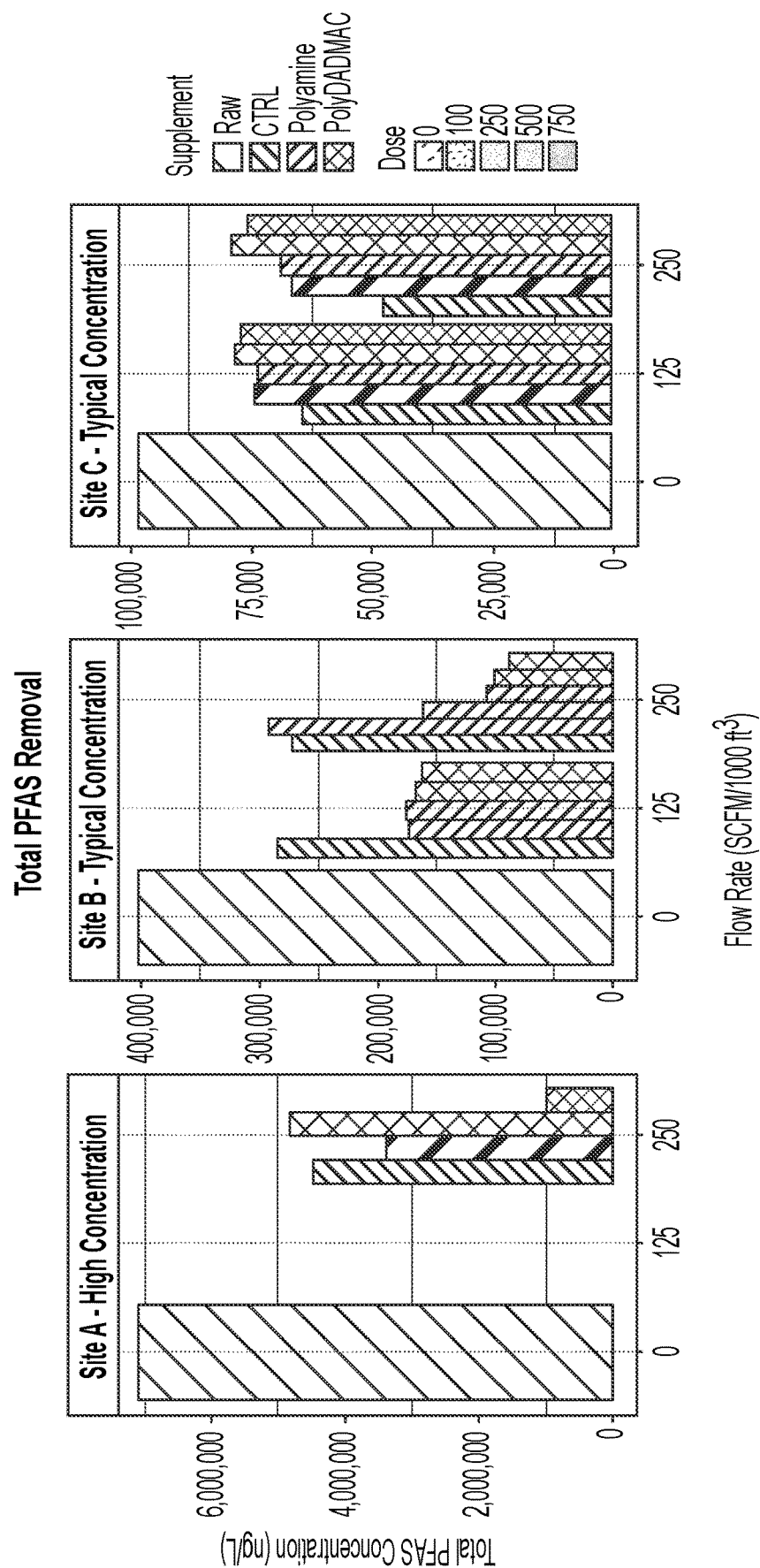
FIG. 11 is a bar graph showing total PFAS removal for air control, polyamine, and PolyDADMAC runs on three different samples.

Comparing the raw untreated leachates and the control runs (without coagulant addition), aeration alone was effective in removing PFAS as shown in FIG. 3 and FIG. 11. However, PFAS removal was significantly enhanced with the addition of either cationic polymeric coagulant. With reference to FIG. 10, cationic polymers were highly effective at reducing the concentration of PFOS at 125 SCFM/1,000 ft³ and to a greater extent at 250 SCFM/1,000 ft³ air flow rates. Numerical results are shown in Table 4 (flow rates in SCFM/1,000 ft³).

TABLE 4

PFOS Removal

| Source | PFOS in Raw Leachate (ppt) | PFOS in Treated Leachate (ppt) | Removal (%) | Flow Rate | Flocculant | Flocculant Dose (mg/L) |
|---|---|---|---|---|---|---|
| Site A | 750,000 | 2,000 | 99.7 | 250 | PolyDADMAC | 500 |
| Site B | 35,000 | 410 | 98.8 | 250 | Polyamine | 750 |
| Site C | 1,900 | 25 (½ MDL) | 98.7 | 250 | Polyamine/PolyDADMAC | 100 |

*MDL = method detection limit

With reference to FIG. 11, direct aeration without the addition of cationic polymer removes some of the total PFAS. The addition of polyamine or PolyDADMAC, however, enhanced total PFAS removal. In general, higher air flow rates resulted in more PFAS removal, regardless of the amount of cationic polymer used. Certain samples contained high concentrations of short-chain PFAS (e.g., PFBA), and it was more challenging to remove those shorter chain PFAS. Numeral removal % results are shown in Table 5.

TABLE 5

Total PFAS Removal

| Source | Total PFAS in Raw Leachate (ng/L) | Total PFAS in Treated Leachate (ng/L) | Removal (%) |
|---|---|---|---|
| Site A | 7,100,000 | 1,000,000 | 86 |
| Site B | 400,000 | 88,000 | 78 |
| Site C | 98,000 | 48,000 | 51 |

In general, results indicate that aeration in combination with the use of cationic polymeric coagulant is an effective method for removal of PFAS, including PFOA and PFOS (≥99% of PFOA and PFOS removal was observed from three different leachate samples). Cationic polymeric coagulants such as polyamine or polyDADMAC are effective in enhancing PFAS partitioning into the foam layer. The type and dose of coagulant are leachate-specific and are dependent on factors including the leachate matrix, PFAS composition, initial PFAS concentrations, and PFAS treatment targets. Higher air flow rates generally resulted in more PFAS removal, but with diminishing returns because PFAS removal rates were not observed to be linear to the incremental increase in air flow rate. Aeration in combination with coagulant addition was more effective in removing long-chain PFAS (≥C6) than short-chain PFAS and sulfonic acids than carboxylic acids (e.g., PFOS removal was shown to be greater than that of PFOA under the same treatment conditions).

Features and advantages of this disclosure are apparent from the detailed specification, and the claims cover all such features and advantages. Numerous variations will occur to those skilled in the art, and any variations equivalent to those described in this disclosure fall within the scope of this disclosure. Those skilled in the art will appreciate that the conception upon which this disclosure is based may be used as a basis for designing other methods and systems for carrying out the several purposes of this disclosure. As a result, the claims should not be considered as limited by the description or examples.

What is claimed is:

1. A method for treating waste water to enhance the removal of a per- and polyfluoroalkyl substances (PFAS) component from waste water, the method comprising:

a) contacting the waste water comprising water and the PFAS component with a cationic polymer, wherein the cationic polymer comprises at least one of a polyacrylamide, a polyacrylic acid, a polydiallyldimethyl ammonium, or a polyamine;
b) bubbling a gas through the waste water to form a foam on the surface of the waste water comprising the gas and at least some of the PFAS component; and
c) removing at least some of the foam off the surface of the waste water, thereby removing at least some of the PFAS component from the waste water to form a lower PFAS component content waste water;
wherein the method steps a-c all take place in the same vessel.

2. The method of claim 1, wherein the waste water comprises a leachate, landfill liquid, condensate, or gas well liquid.

3. The method of claim 1, wherein the waste water comprises a landfill leachate.

4. The method of claim 1, wherein the waste water comprises organics having a chemical oxygen demand (COD) of from 500 to 80,000 mg/L.

5. The method of claim 1, wherein the waste water comprises from 1,000 to 15,000 mg/L total dissolved solids (TDS).

6. The method of claim 1, wherein the waste water comprises from 50 to 3,000 mg/L ammonia as nitrogen.

7. The method of claim 1, wherein the waste water comprises humic acid and at least one metal.

8. The method of claim 1, wherein the PFAS component comprises a perfluorosulfonic acid, a perfluorosulfonate, a perfluorocarboxylic acid, a perfluorocarboxylate, or an anionic salt thereof.

9. The method of claim 1, wherein the PFAS component comprises at least one of perfluorooctanoic acid (PFOA), perfluorooctanesulfonic acid (PFOS), or an anionic salt thereof.

10. The method of claim 1, wherein the PFAS component comprises both PFOA and PFOS or an anionic salt thereof.

11. The method of claim 1, wherein the waste water comprises from 10 ng/L to 25 mg/L of each PFAS component.

12. The method of claim 1, wherein the amount of cationic polymer used is from 5 mg/L to 10,000 mg/L.

13. The method of claim 1, wherein the gas comprises air.

14. The method of claim 1, wherein the gas comprises ozone.

15. The method of claim 1, wherein the bubbling a gas is a diffused aeration process.

16. The method of claim 1, wherein bubbling the gas produces micron sized or larger bubbles.

17. The method of claim 1, wherein the amount of gas used is from 10 to 1,000 standard cubic feet per minute (SCFM) per 1,000 cubic feet of waste water.

18. The method of claim 1, wherein the contacting step a and bubbling step b are performed simultaneously in a continuous process.

19. The method of claim 1, wherein prior to step a or during step a or step b, the pH of the waste water is adjusted to about neutral.

20. The method of claim 1, wherein the removing step comprises skimming the foam off the surface of the waste water, vacuum collection of the foam, or overflowing the foam into a collection tank.

21. The method of claim 1, wherein after the removing step, the removed PFAS component is solidified and stored in a landfill or is transported to a deep well site for injection.

22. The method of claim 1, wherein after the removing step, the lower PFAS component content waste water is discharged to a publicly owned treatment works.

23. The method of claim 1, wherein the PFAS component comprises PFOA and the removal efficiency of the PFOA is at least 90%.

24. The method of claim 1, wherein the PFAS component comprises PFOS and the removal efficiency of the PFOS is at least 90%.

25. The method of claim 1, wherein the method does not further comprise an oxidation treatment of the PFAS component.

26. A method for treating waste water to enhance the removal of a per- and polyfluoroalkyl substances (PFAS) component from waste water, the method consisting essentially of:
a) contacting the waste water comprising water and the PFAS component with a cationic polymer, wherein the cationic polymer comprises at least one of a polyacrylamide, a polyacrylic acid, a polydiallyldimethyl ammonium, or a polyamine;
b) bubbling a gas through the waste water to form a foam on the surface of the waste water comprising the gas and at least some of the PFAS component; and
c) removing at least some of the foam off the surface of the waste water, thereby removing at least some of the PFAS component from the waste water to form a lower PFAS component content waste water.

27. A method for treating waste water to enhance the removal of a per- and polyfluoroalkyl substances (PFAS) component from waste water, the method comprising:
a) contacting the waste water comprising water and the PFAS component with a cationic polymer, wherein the cationic polymer comprises:
i) a polydiallyldimethyl ammonium having the following repeating unit:

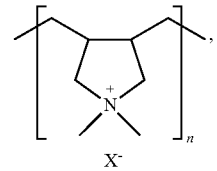

wherein X is an anion;
ii) or a polyamine having the following repeating unit:

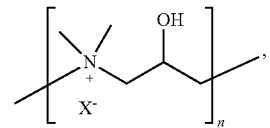

wherein X is an anion;
b) bubbling a gas through the waste water to form a foam on the surface of the waste water comprising the gas and at least some of the PFAS component; and
c) removing at least some of the foam off the surface of the waste water, thereby removing at least some of the PFAS component from the waste water to form a lower PFAS component content waste water.

28. The method of claim 27, wherein the method steps a-c all take place in the same vessel.

29. The method of claim 27, wherein the PFAS component has six to fourteen carbons.

30. The method of claim 29, wherein the PFAS component is PFHxS, PFHpS, PFOS, PFNS, PFDS, PFDoS, PFHxA, PFHpA, PFOA, PFNA, PFDA, PFUnDA, PFDoDA, PFTrDA, or an anionic salt thereof.

31. The method of claim 29, wherein the cationic polymer comprises the polyamine.

32. The method of claim 27, wherein the PFAS component has four to six carbons.

33. The method of claim 32, wherein the PFAS component is PFBA, PFBS, PFPeA, PFPeS, PFHxA, or an anionic salt thereof.

34. The method of claim 32, wherein the cationic polymer comprises the polydiallyldimethyl ammonium.

* * * * *